(12) United States Patent　(10) Patent No.: US 8,923,928 B2
Sawai　(45) Date of Patent: Dec. 30, 2014

(54) AUDIO PLAYBACK APPARATUS, CONTROL AND USAGE METHOD FOR AUDIO PLAYBACK APPARATUS, AND MOBILE PHONE TERMINAL WITH STORAGE DEVICE

(75) Inventor: Shunichiroh Sawai, Kanagawa (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 836 days.

(21) Appl. No.: 13/032,987

(22) Filed: Feb. 23, 2011

(65) Prior Publication Data

US 2011/0299697 A1　Dec. 8, 2011

Related U.S. Application Data

(60) Provisional application No. 61/351,524, filed on Jun. 4, 2010.

(51) Int. Cl.
| | | |
|---|---|---|
| H04M 1/00 | (2006.01) | |
| H04M 1/725 | (2006.01) | |
| H04H 60/80 | (2008.01) | |
| H04M 1/60 | (2006.01) | |
| H04B 1/38 | (2006.01) | |

(52) U.S. Cl.
CPC ............ *H04H 60/80* (2013.01); *H04M 1/7253* (2013.01); *H04M 1/72558* (2013.01); *H04M 1/6066* (2013.01); *H04B 1/3805* (2013.01)
USPC ....... 455/569.1; 455/41.2; 455/557; 455/3.06

(58) Field of Classification Search
CPC .......................... H04M 1/6041; H04M 1/6058
USPC ............ 455/41.1, 41.2, 41.3, 3.01, 3.03, 420, 455/68, 557, 550.1, 552.1, 569.1, 3.06, 419
See application file for complete search history.

(56) References Cited

U.S. PATENT DOCUMENTS 7,742,740 B2 * 6/2010 Goldberg et al. ............ 455/3.06
8,379,874 B1 * 2/2013 Simon ......................... 455/41.2

(Continued)

FOREIGN PATENT DOCUMENTS

CN　101296000 A　10/2008
EP　1 161 064 A2　12/2001

(Continued)

OTHER PUBLICATIONS

Combined Chinese Office Action and Search Report Issued Apr. 19, 2013 in Patent Application No. 201110107610.8 (with English translation).

(Continued)

*Primary Examiner* — John J Lee
(74) *Attorney, Agent, or Firm* — Oblon, Spivak, McClelland, Maier & Neustadt, L.L.P.

(57) ABSTRACT

An audio playback apparatus includes an integrated circuit in which an FM reception circuit and a near field wireless communication circuit are integrated and packaged into one chip, a switch unit configured to switch between output of an audio signal supplied from the FM reception circuit and output of an audio signal supplied from the near field wireless communication circuit, and a connection terminal configured to output an audio signal selected using the switch unit and supply an FM broadcast signal received through a cable of an earphone connected to the connection terminal to the FM reception circuit. An associated method performed by the audio playback apparatus cooperates with the mobile terminal apparatus and associated method to provide a functional system.

22 Claims, 12 Drawing Sheets

(56) References Cited

U.S. PATENT DOCUMENTS

| | | | |
|---|---|---|---|
| 8,489,151 B2* | 7/2013 | Van Engelen et al. | 455/569.1 |
| 8,548,381 B2* | 10/2013 | Dua | 455/41.2 |
| 2001/0049262 A1 | 12/2001 | Lehtonen | |
| 2004/0204168 A1 | 10/2004 | Laurila | |
| 2009/0018841 A1* | 1/2009 | Leeds et al. | 704/272 |

FOREIGN PATENT DOCUMENTS

| | | |
|---|---|---|
| EP | 1 161 064 A3 | 12/2001 |
| EP | 1 739 925 A1 | 1/2007 |
| JP | 09-331209 A | 12/1997 |
| JP | 2008-258728 A | 10/2008 |
| WO | WO 2010/052361 A1 | 5/2010 |

OTHER PUBLICATIONS

Extended European Search Report issued Aug. 11, 2011, in European Patent Application No. 11159913.0.

Sony Ericsson: "MW600 Extended User Guide", XP-002654459, Apr. 15, 2010, URL: http://www.sonyericsson.com/cws/download/1/775/277/1269520987/MW600_UG_EN_1236-6504_1.pdf, 20 pages.

European Search Report dated Aug. 13, 2014 in European Patent Application 11 159 913.0 (in English).

* cited by examiner

AUDIO PLAYBACK APPARATUS, CONTROL AND USAGE METHOD FOR AUDIO PLAYBACK APPARATUS, AND MOBILE PHONE TERMINAL WITH STORAGE DEVICE

CROSS REFERENCE TO RELATED PATENT APPLICATION

The present application claims the benefit of the earlier filing date of U.S. Provisional Patent Application Ser. No. 61/351,524 filed in the USPTO on Jun. 4, 2010, the entire contents of which being incorporated herein by reference.

BACKGROUND

1. Field of the Invention

The present invention relates to an apparatus, as well as associated method and computer program storage device, that is connected through wireless communication to a mobile phone terminal or a music playback apparatus having a music playback function and that is used for playing back audio.

2. Description of the Related Art

In mobile frequency modulation (FM) radio receivers according to the related art, a cable of an earphone (earphone cable) connected to the receiver has been used as an antenna in order to appropriately receive a FM radio broadcast.

Also, in recent years, mobile phone terminals having a function of receiving FM radio broadcast have been provided. In such mobile phone terminals, too, an earphone cable connected thereto has been used as an antenna.

For the purpose of increasing reception sensitivity, various improvements have been made on such an earphone that is connected to a radio receiver or a mobile phone terminal having a function of receiving FM radio broadcast and that has a cable used as an antenna.

For example, Japanese Unexamined Patent Application Publication No. 9-331209 discloses a technology of providing an earphone cable with a high-frequency choke coil and a capacitor connected in parallel to the choke coil in a high-frequency manner, thereby preventing a decrease in FM reception sensitivity in the case of using the earphone cable as an antenna.

Also, Japanese Unexamined Patent Application Publication No. 2008-258728 discloses a technology of integrally forming antennas of different frequency bands, thereby improving reception performances in the respective frequency bands.

SUMMARY

In recent years, use of a headset that receives played back audio signals through near field wireless communication to enable listening has become common in mobile music players, mobile phone terminals having a music playback function, and other similar mobile apparatuses capable of playing back audio information, such as music. As headsets having a near field wireless communication function (hereinafter referred to as wireless headsets), headsets of the Bluetooth standard have become widespread, for example.

In a mobile music player or a mobile phone terminal having a music playback function, a played back audio signal is transmitted to a wireless headset through near field wireless communication. The wireless headset receives the audio signal transmitted thereto and outputs the sound corresponding to the audio signal from a speaker, such as an earphone thereof.

In this way, since the mobile terminal is not connected to the wireless headset through a wire, the convenience of using the terminal apparatus increases. For example, the degree of freedom of handling the terminal apparatus increases.

However, even if the mobile music player or the mobile phone terminal has a function of receiving FM radio broadcast, the wireless headset is unusable for listening to the FM radio broadcast.

This is because, as described above, the wireless headset serving as a wireless earphone is not connected to a mobile apparatus, such as the mobile music player or the mobile phone terminal, through a wire. Therefore, the wireless headset is incapable of functioning as an antenna for a reception circuit of FM radio broadcast included in the mobile apparatus.

That is, as illustrated in FIG. 13, in a mobile terminal 400 including an audio playback circuit 401, a near field wireless communication unit 402, and an FM reception circuit 403, a wired earphone 450 has an FM antenna function. Thus, in the mobile terminal 400, the connection between the FM reception circuit 403 of the mobile terminal 400 and the earphone 450 is a precondition for using an FM radio function.

However, in the configuration illustrated in FIG. 13, an antenna for an FM radio receiver does not exist during use of a wireless headset 300. Thus, even if the FM reception circuit 403 is capable of supplying a received signal to the near field wireless communication unit 402, it is difficult to appropriately receive FM radio broadcast. Thus, in the configuration illustrated in FIG. 13, a user is incapable of listening to broadcast that is received through the FM radio reception function of the mobile terminal 400 by using the wireless headset 300.

Accordingly, it is desirable to enable a user to listen to the sound corresponding to an audio signal transmitted through near field wireless communication and to listen to the sound corresponding to an FM broadcast signal.

An audio playback apparatus according to an embodiment of the present invention includes the following elements: an integrated circuit in which an FM reception circuit and a near field wireless communication circuit are integrated and packaged into one chip; switch means for switching between output of an audio signal supplied from the FM reception circuit and output of an audio signal supplied from the near field wireless communication circuit; and a connection terminal configured to output an audio signal selected using the switch means and supply an FM broadcast signal received through a cable of an earphone connected to the connection terminal to the FM reception circuit.

This audio playback apparatus includes the integrated circuit in which the FM reception circuit and the near field wireless communication circuit are integrated and packaged into one chip. Here, the term "chip" is a generic term for packaged semiconductor integrated circuits (ICs).

The switch means switches between output of an audio signal supplied from the FM reception circuit of the integrated circuit and output of an audio signal supplied from the near field wireless communication circuit. An earphone or the like is connected to the connection terminal. The connection terminal is configured to output an audio signal and supply an FM broadcast signal received through a cable of the earphone connected to the connection terminal to the FM reception circuit of the integrated circuit.

Accordingly, a user can selectively listen to the sound corresponding to a played back audio signal received from a terminal apparatus, such as a mobile music player, through the near field wireless communication circuit, or the sound corresponding to a broadcast signal received by the FM reception circuit.

Since the FM reception circuit is mounted in the audio playback apparatus, and thus it is not necessary to mount the FM reception circuit in a terminal apparatus, such as a mobile music player. Therefore, a side effect is that the configuration of the terminal apparatus can be simplified and obtained.

An audio playback apparatus according to another embodiment of the present invention includes the following elements: an FM reception circuit; a near field wireless communication circuit; switch means for switching between output of an audio signal supplied from the FM reception circuit and output of an audio signal supplied from the near field wireless communication circuit; a connection terminal configured to output an audio signal selected using the switch means and supply an FM broadcast signal received through a cable of an earphone connected to the connection terminal to the FM reception circuit; switch control means for controlling switching of the switch means in accordance with a switch request accepted through the near field wireless communication circuit; control means for controlling at least the FM reception circuit in accordance with a request accepted through the near field wireless communication circuit; and information providing means for obtaining at least information representing a status of the FM reception circuit and transmitting the information through the near field wireless communication circuit.

This audio playback apparatus includes the FM reception circuit and the near field wireless communication circuit. An earphone or the like is connected to the connection terminal.

The connection terminal is configured to output an audio signal and supply an FM broadcast signal received through a cable of the earphone connected to the connection terminal to the FM reception circuit.

The switch means is switched by the switch control means in accordance with a switch request that is received through the near field wireless communication unit, so that output of an audio signal from the FM reception circuit or output of an audio signal from the near field wireless communication circuit is selected.

Also, at least the FM reception circuit is controlled by the control means in accordance with a request accepted through the near field wireless communication unit, so that a channel is selected. Also, at least information representing the status of the FM reception circuit is obtained by the information providing means, and the information is transmitted through the near field wireless communication circuit.

Accordingly, a user can selectively listen to the sound corresponding to a played back audio signal received from a terminal apparatus, such as a mobile music player, through the near field wireless communication circuit, or the sound corresponding to a broadcast signal received by the FM reception circuit in accordance with a request supplied from the terminal apparatus.

Also, a selected channel in the FM reception circuit can be changed or a channel selection status of the FM reception circuit can be provided to the terminal apparatus in accordance with a request supplied from the terminal apparatus.

Thus, the terminal apparatus that does not have the FM reception circuit operates as if it has the FM reception circuit, and a user can listen to the sound corresponding to a broadcast signal that is received by the FM reception circuit of the audio playback apparatus.

According to the embodiments of the present invention, a user can listen to the sound corresponding to an audio signal transmitted through near field wireless communication and the sound corresponding to an FM broadcast signal.

DESCRIPTION OF THE PREFERRED EMBODIMENTS

Hereinafter, an apparatus, a system, and a program according to an embodiment of the present invention will be described with reference to the drawings. A description will be given below about a case where an audio playback apparatus according to an embodiment of the present invention is a wireless headset having a near field wireless communication function of the Bluetooth standard. Also, a description will be given below about a case where a terminal apparatus that transmits an audio signal to the audio playback apparatus through near field wireless communication according to an embodiment of the present invention is a mobile phone terminal having a music playback function.

The foregoing audio playback apparatus and terminal apparatus having a function of supplying an audio signal to the audio playback apparatus constitute a music playback system according to an embodiment of the present invention. A program that is executed by a computer mounted in the audio playback apparatus of the system is a control program for an audio playback apparatus according to an embodiment of the present invention. A program that is executed by the terminal apparatus of the system is an audio playback apparatus usage program according to an embodiment of the present invention.

Basic Configurations of Audio Playback Apparatus and Mobile Phone Terminal

Before describing the details of the apparatus, system, and program according to the embodiment of the present invention, a description will be given about a basic configuration of the audio playback apparatus according to the embodiment of the present invention and a basic configuration of the mobile phone terminal having a function of transmitting an audio signal to the audio playback apparatus.

Figure 1:
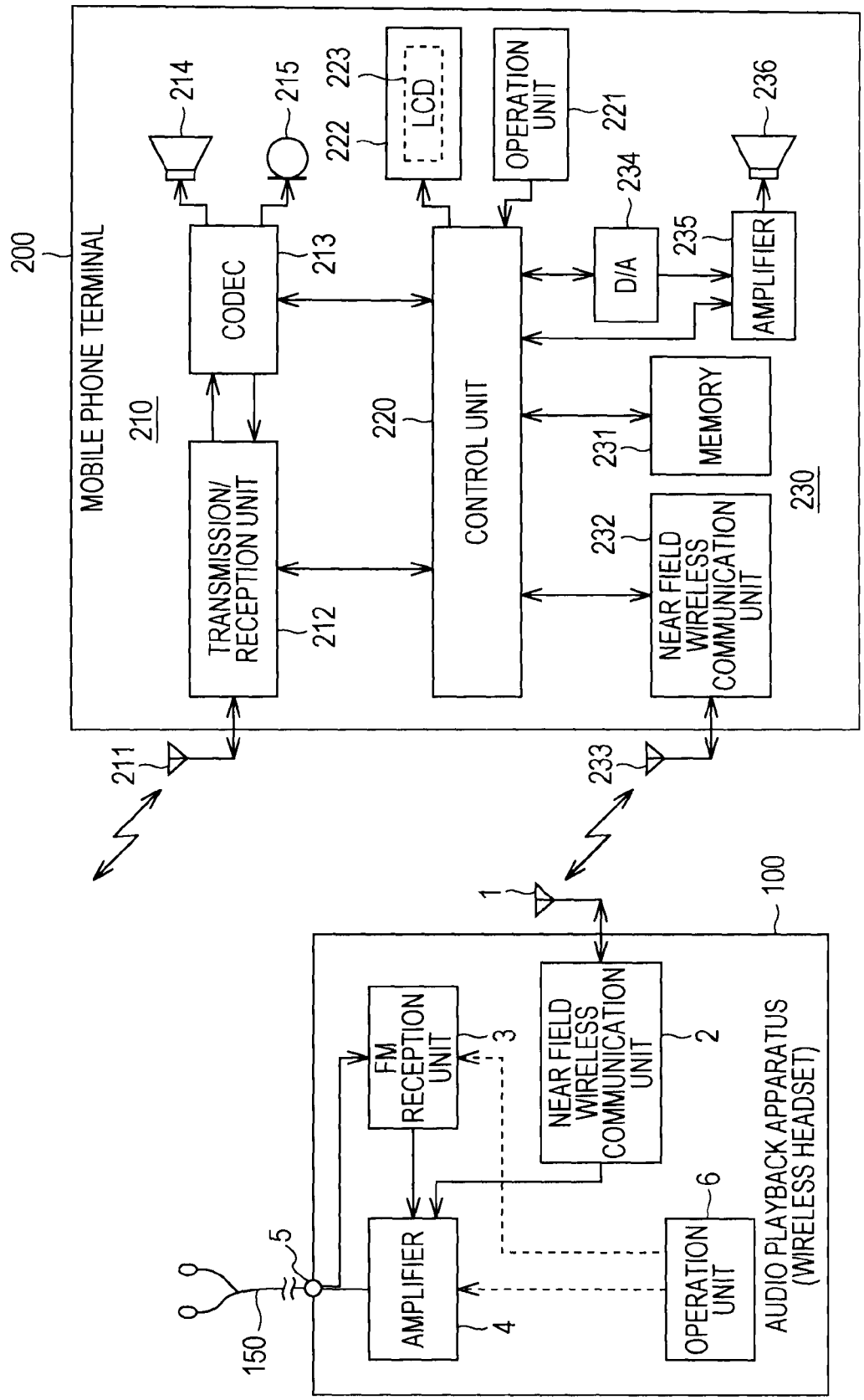
FIG. 1 is a block diagram for explaining basic configurations of an audio playback apparatus and a mobile phone terminal according to an embodiment.

FIG. 1 is a block diagram for explaining basic configurations of an audio playback apparatus (wireless headset) 100 and a mobile phone terminal 200 according to an embodiment described below. As illustrated in FIG. 1, the audio playback apparatus 100 according to the embodiment includes, in its basic configuration, a transmission/reception antenna 1 for use in near field wireless communication, a near field wireless communication unit 2, an FM reception unit 3, an amplifier (amplifier circuit) 4, a connection terminal 5 for an earphone or the like, and an operation unit 6.

The audio playback apparatus 100 has a configuration capable of selecting either of an audio signal that is received through the transmission/reception antenna 1 and the near field wireless communication unit 2 and an audio signal (FM broadcast signal) that is demodulated after being selected from among signals received by the FM reception unit 3, and supplying the selected audio signal to the amplifier 4. The amplifier 4 amplifies the audio signal supplied thereto and supplies the amplified audio signal to an earphone 150 connected to the connection terminal 5 through the connection terminal 5.

Accordingly, a user can listen to the sound corresponding to the audio signal supplied from the near field wireless communication unit 2 or the sound corresponding to the audio signal supplied from the FM reception unit 3 by using the earphone 150. As illustrated in FIG. 1, the connection terminal 5 is connected to the FM reception unit 3. Thus, the cable of the earphone 150 is used as an antenna for receiving FM broadcast signals. Accordingly, the FM reception unit 3 can appropriately receive FM broadcast signals.

Which of the audio signal supplied from the near field wireless communication unit 2 and the audio signal supplied from the FM reception unit 3 is to be supplied to the amplifier 4 is determined in accordance with input of an operation from a user accepted through the operation unit 6 or a switch request (switch control signal) provided from the mobile phone terminal 200 in response to an instruction from a user (the details will be described below). Also, the part other than the foregoing basic configuration will be described in detail below.

The near field wireless communication unit 2 and the FM reception unit 3 are mounted in the audio playback apparatus 100. Those two circuit units may be integrated into a single chip, which serves as a packaged integrated circuit.

Examples of the integrated circuit including the near field wireless communication unit 2 and the FM reception unit 3 are disclosed in the following web pages, for example, the contents of which being incorporated herein by reference.

http://www.stericsson.com/product/207236.jsp
http://www.stericsson.com/product/191760.jsp On the other hand, the mobile phone terminal 200 includes a communication system 210 that performs telephone communication, an audio playback system 230 that plays back audio data, such as music data, accumulated in a memory 231, and a control unit 220 that controls individual units of those systems, as illustrated in FIG. 1.

The control unit 220 is provided with an operation unit 221 that accepts input of an operation from a user and a liquid crystal display (LCD) 222 serving as a display device. Also, a touch panel 223 is provided on the display screen of the LCD 222. Accordingly, information displayed on the display screen of the LCD 222 and the touch panel 223 can constitute an input unit.

Although not illustrated, the control unit 220 is a microcomputer including a central processing unit (CPU), a read only memory (ROM), a random access memory (RAM), and an electrically erasable and programmable ROM (EEPROM), which are mutually connected through a CPU bus.

Here, the CPU predominantly performs control. That is, the CPU reads and executes a program stored in the ROM or EEPROM, generates control signals that are to be transmitted to individual units, supplies the control signals to the individual units concerned, and receives and processes data supplied from the individual units. The ROM stores in advance various processing programs executed by the CPU and data that is necessary for processing, as described above.

The RAM is mainly used as a work area, for example, the RAM temporarily stores an in-progress result of various processes. The EEPROM is a so-called non-volatile memory that is rewritable, and stores and holds data that should be held even when the power is turned off, for example, a new program for adding a function, various setting parameters, and various pieces of information including telephone book data.

Next, the communication system 210 will be described. The communication system 210 includes a transmission/reception antenna 211 for use in telephone communication, a transmission/reception unit 212, a codec 213, a speaker 214 serving as a receiver, and a microphone 215 serving as a transmitter. The transmission/reception antenna 211 for use in telephone communication receives a signal from a base station and transmits a signal from the mobile phone terminal 200.

The transmission/reception unit 212 includes an antenna duplexer, a reception circuit, a transmission circuit, a local oscillation unit (frequency synthesizer), a baseband processing unit, etc., although not illustrated. The transmission/reception unit 212 demodulates a signal received through the transmission/reception antenna 211, performs analog-to-digital (A/D) conversion on the signal, and separates control data and audio data from each other under control performed by the control unit 220. The control data separated by the transmission/reception unit 212 is supplied to the control unit 220 and is used for controlling the mobile phone terminal 200, whereas the audio data is supplied to the codec 213.

The codec 213 performs digital-to-analog (D/A) conversion on the audio data (digital signal) supplied from the transmission/reception unit 212 to generate an analog audio signal and supplies the signal to the speaker 214. Accordingly, the voice corresponding to an audio signal transmitted from the other end of a call can be output from the speaker 214 serving as a receiver, so that the user can listen to the voice.

On the other hand, the voice (speech voice) of the user of the mobile phone terminal 200 is collected through the microphone 215 serving as a transmitter and is converted into an electric signal (analog signal), which is supplied to the codec 213. The codec 213 performs A/D conversion on the audio signal supplied from the microphone 215 to generate audio data as a digital signal, and supplies the audio data to the transmission/reception unit 212.

The transmission/reception unit 212 adds necessary data, such as control data, supplied from the control unit 220 to the audio data supplied from the codec 213, performs D/A conversion on the data to generate an analog signal to be transmitted, and generates a transmission signal that is to be actually transmitted by modulating or amplifying the signal.

Then, the transmission/reception unit 212 transmits the generated transmission signal through the transmission/reception antenna 211.

In this way, the function of the communication system 210 enables a user to make a call to the other end. In addition, the mobile phone terminal 200 according to this embodiment enables the user to access the Internet to browse a target web page and to transmit/receive an e-mail, in addition to make a call.

In this case, the control unit 220 transmits/receives necessary information through the transmission/reception antenna 211 and the transmission/reception unit 212, whereby the user can browse a web page and transmit/receive an e-mail.

Next, the audio playback system 230 will be described. The audio playback system 230 includes the memory 231, a near field wireless communication unit 232, a transmission/reception antenna 233 for use in near field wireless communication, a D/A converter 234, an amplifier 235, and a loudspeaker 236.

The memory 231 stores audio data, such as music data. The following data is recorded on the memory 231 through the control unit 220, for example, music data downloaded from a server apparatus on the Internet, music data supplied from an external apparatus, such as a personal computer, through an external input/output terminal (not illustrated), etc.

A predetermined process is performed on audio data, such as music data, read from the memory 231 by the control unit 220, for example, necessary information is added to the audio data. Then, the audio data is transmitted to the audio playback apparatus 100 through the near field wireless communication unit 232 and the transmission/reception antenna 233.

Accordingly, the audio playback apparatus 100 receives a played back audio signal transmitted from the mobile phone terminal 200. Then, as described above, when a selection is made to output an audio signal supplied from the near field wireless communication unit 2, the user can listen to the audio signal through the earphone 150 connected to the connection terminal 5.

Also, the sound corresponding to audio data, such as music data, read from the memory 231 by the control unit 220 can be output from the loudspeaker 236 of the mobile phone terminal 200. In this case, the audio data read from the memory 231 by the control unit 220 is converted by the control unit 220 into audio data to be played back, is converted by the D/A converter 234 into an analog audio signal, and is supplied to the loudspeaker 236 through the amplifier 235.

Although the details will be described below, the mobile phone terminal 200 is capable of playing back audio data received through the transmission/reception antenna 233 and the near field wireless communication unit 232 through the control unit 220, the D/A converter 234, the amplifier 235, and the loudspeaker 236.

As described above, the audio playback apparatus 100 is capable of receiving a played back audio signal supplied from the mobile phone terminal 200 and playing back the audio signal, and is also capable of playing back an FM broadcast signal received by the FM reception unit 3 of the audio playback apparatus 100. That is, with the configuration illustrated in FIG. 1, the cable of the earphone 150 connected to the connection terminal 5 of the audio playback apparatus 100 can function as the antenna of the FM reception unit 3.

Also, a function of receiving FM broadcast signals can be provided to an apparatus, such as a mobile phone terminal, that has a near field wireless communication function and that does not have an FM reception unit. Thus, no special change is necessary on a terminal apparatus side, such as a mobile phone terminal, or no more than installation of software.

Thus, installation of software that is necessary on the mobile apparatus side for using the audio playback apparatus 100 can be easily performed by a user's hand. Therefore, the audio playback apparatus 100 according to this embodiment can be used in most of mobile apparatuses having an existing near field wireless communication function.

Also, in the development of mobile terminals based on the assumption of using an accessory, such as an audio playback apparatus (wireless headset), it is not necessary to provide hardware for receiving FM broadcast, which is not indispensable for all users of mobile terminals, to the mobile terminals. This is advantageous in terms of the volume and cost of the mobile terminal, and the cases of forcing a user to have an unnecessary function can be reduced.

Next, audio playback apparatuses, systems, and programs according to embodiments of the present invention will be described in detail. First, a description will be given about two embodiments in which a function of receiving FM broadcast completes inside the audio playback apparatus 100 and in which the mobile phone terminal 200 has no involvement in the function of receiving FM broadcast.

After that, a description will be given about one embodiment in which the audio playback apparatus 100 and the mobile phone terminal 200 mutually transmit necessary information so that the mobile phone terminal 200 that does not have a function of receiving FM broadcast operates as if it has the function of receiving FM broadcast.

First Embodiment

According to a first embodiment described below, a function of receiving FM broadcast completes inside the audio playback apparatus 100, and the mobile phone terminal 200 has no involvement in the function of receiving FM broadcast.

Example of Configuration of Apparatus

Figure 2:
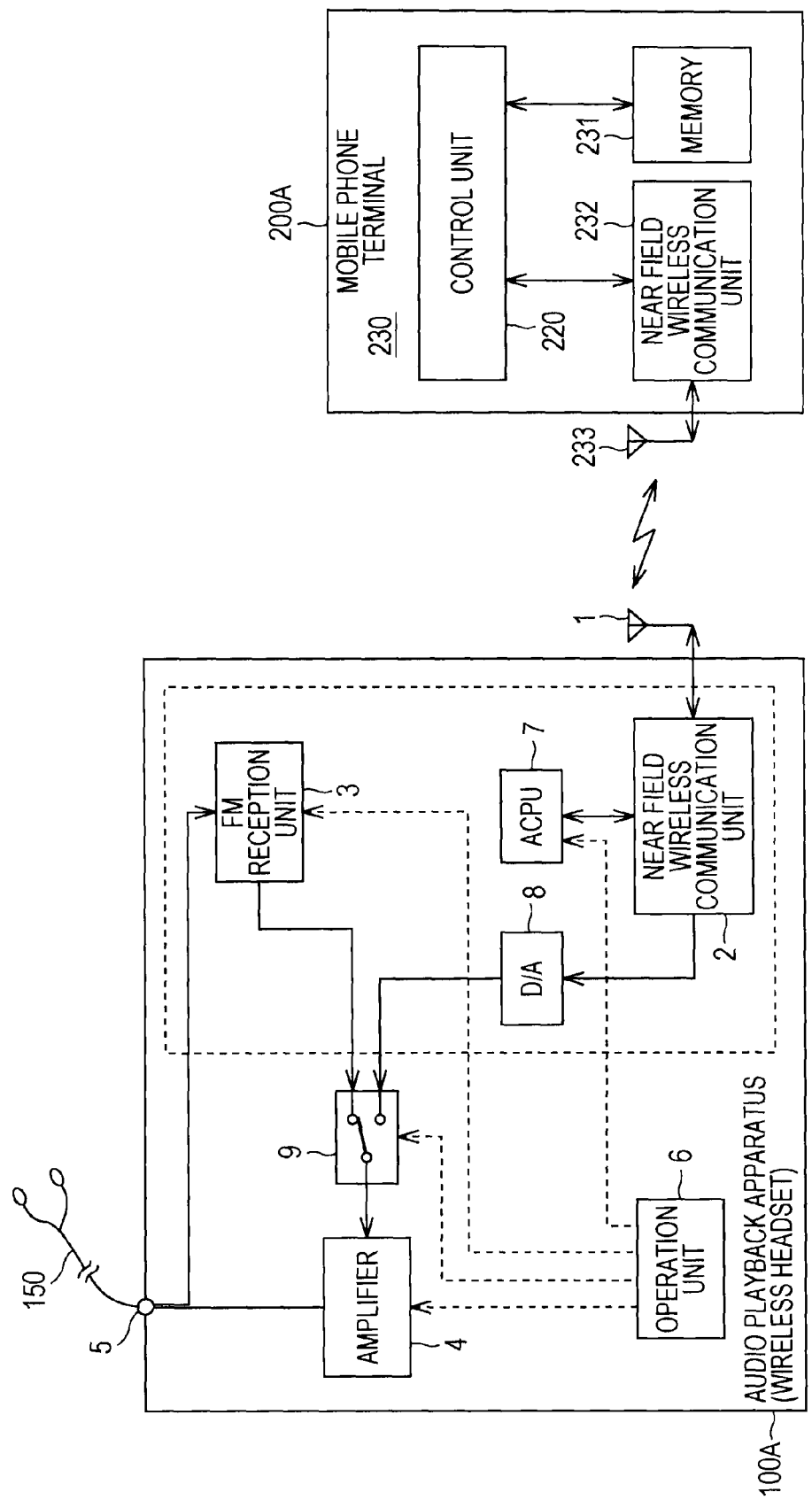
FIG. 2 is a block diagram for explaining an audio playback apparatus according to a first embodiment.

FIG. 2 is a block diagram for explaining an audio playback apparatus 100A according to the first embodiment. Referring to FIG. 2, a mobile phone terminal 200A that supplies audio signals to the audio playback apparatus 100A has a configuration similar to that of the mobile phone terminal 200 illustrated in FIG. 1. For simple explanation, the part related to audio playback of the mobile phone terminal 200A is illustrated in FIG. 2, and illustration of the other part of the mobile phone terminal 200A is omitted.

The audio playback apparatus 100A illustrated in FIG. 2 corresponds to the audio playback apparatus 100 illustrated in FIG. 1. That is, the audio playback apparatus 100A according to the first embodiment includes the transmission/reception antenna 1 for use in near field wireless communication, the near field wireless communication unit 2, the FM reception unit 3, the amplifier (amplifier circuit) 4, the connection terminal 5 for the earphone 150 or the like, and the operation unit 6.

As described above, the transmission/reception antenna 1 for use in near field wireless communication and the near field wireless communication unit 2 wirelessly transmit information to/receive information from a neighboring terminal, the mobile phone terminal 200A in this case, in accordance with the Bluetooth standard.

The FM reception unit 3 receives and captures FM broadcast signals that are received by the cable of the earphone 150 connected to the connection terminal 5, as described above. That is, the FM reception unit 3 includes all circuits for receiving FM broadcast signals, demodulating an audio signal to be played back selected from among the FM broadcast signals, and outputting the audio signal, e.g., part of a reception antenna, a channel selection circuit, and a demodulating circuit.

In addition, the FM reception unit 3 is capable of receiving FM audio signals included in television broadcast signals in a VHF band, selecting a signal of a certain channel from among the received signals, and demodulating the selected signal. While the present embodiment describes the reception and controlled playback of FM broadcast signals, the invention is not so limited and may be used to receive and playback digital audio broadcast signals (terrestrial and satellite, as well as Internet wireless radio, for example).

The amplifier 4 amplifies the audio signal supplied thereto and supplies the amplified signal to the earphone 150 connected to the connection terminal 5. The operation unit 6 accepts input of an operation from a user and supplies instruction information corresponding to the operation to the unit concerned.

Although the details will be described below, the operation unit 6 of the audio playback apparatus 100A according to the first embodiment includes various types operation units, such as a plurality of button switches, a dial, a slide key, and a so-called jog dial. Here, the dial is rotated, and the slide key is slid. Alternatively, an operation based on detection of electrostatic capacity may be accepted.

Also, the audio playback apparatus 100A according to the first embodiment includes an application central processing unit (ACPU) 7, a D/A converter 8, and a switch circuit 9.

The ACPU 7 controls the near field wireless communication unit 2 in accordance with input of an operation accepted through the operation unit 6. Also, the ACPU 7 separates data (e.g., control data) from audio data received through the near field wireless communication unit 2, performs decompression when the audio data is compressed, and performs a process related to the audio data.

The D/A converter 8 converts audio data (digital audio signal) that is received and processed through the near field wireless communication unit 2 into an analog audio signal. The switch circuit 9 switches between output of an audio signal corresponding to an FM broadcast signal that is received and demodulated by the FM reception unit 3 and output of an audio signal that is received through the near field wireless communication unit 2 and that is D/A converted by the D/A converter 8.

In the audio playback apparatus 100A illustrated in FIG. 2, the near field wireless communication unit 2, the FM reception unit 3, the ACPU 7, and the A/D converter 8 surrounded by a broken line are packaged into a single chip to constitute an integrated circuit.

In the audio playback apparatus 100A according to the first embodiment, the switch circuit 9 can be directly switched in accordance with input of an operation accepted from a user through the operation unit 6. Also, the amplifier 4 is capable of directly adjusting the volume in accordance with input of an operation accepted from a user through the operation unit 6. Furthermore, the FM reception unit 3 is capable of directly selecting a channel in accordance with input of an operation accepted from a user through the operation unit 6.

Although the details will be described below, assume that input of an operation accepted from a user through the operation unit 6 is stop of playback, fast-forward, or fast-rewind for audio data that is being played back. In this case, the ACPU 7 generates a signal (command) for requesting stop of playback, fast-forward, or fast-rewind on the basis of an instruction signal corresponding to the operation input from the user through the operation unit 6, and transmits the signal to the mobile phone terminal 200A through the near field wireless communication unit 2. Accordingly, basic control can be performed on generation of audio data in the mobile phone terminal 200A.

In the audio playback apparatus 100A illustrated in FIG. 2, the FM reception unit 3, the amplifier 4, and the switch circuit 9 can be directly adjusted or switched in accordance with input of an operation accepted through the operation unit 6. That is, software for controlling those units is unnecessary, and the simplest configuration can be realized with hardware constituting the individual units.

Operation Method and Operation of Apparatus

Figure 3:
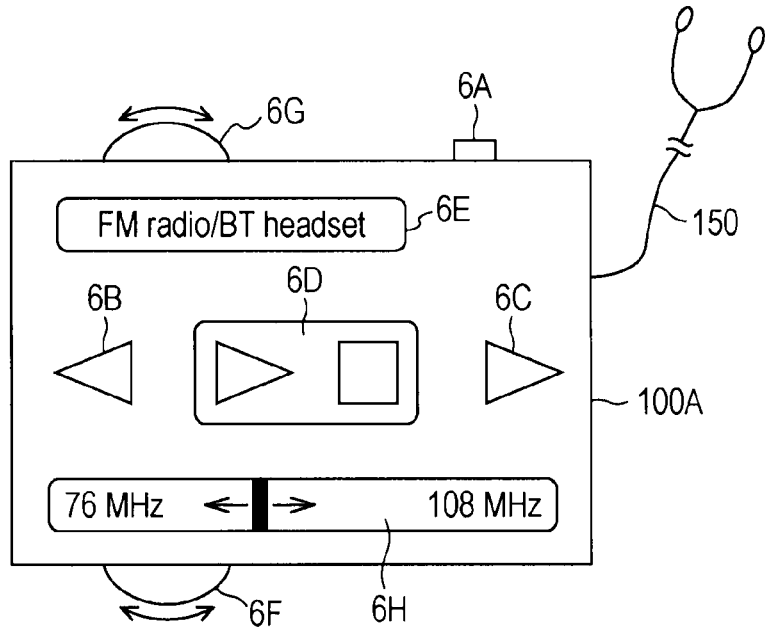
FIG. 3 is a diagram illustrating an example of an appearance of the audio playback apparatus according to the first embodiment.

Next, an operation method and operation of the audio playback apparatus 100A according to the first embodiment will be described. FIG. 3 is a diagram illustrating an example of an appearance of the audio playback apparatus 100A according to the first embodiment. As illustrated in FIG. 3, the audio playback apparatus 100A according to the first embodiment includes a power on/off switch 6A. Also, the audio playback apparatus 100A includes a fast-forward key 6B, a fast-rewind key 6C, and a playback/stop key 6D, which serve as operation keys for controlling the mobile phone terminal 200A during playback of an audio signal supplied from the mobile phone terminal 200A.

Furthermore, the audio playback apparatus 100A includes a mode switch 6E. Every time the mode switch 6E is pressed, the mode is switched between an FM radio mode and a headset mode. The switch circuit 9 is switched by an operation performed on the mode switch 6E.

Here, the FM radio mode is a mode for playing back an FM broadcast signal received through the FM reception unit 3. The headset mode is an audio playback mode according to the related art for playing back an audio signal received from the mobile phone terminal 200A through the near field wireless communication unit 2.

Also, the audio playback apparatus 100A includes a volume adjustment dial 6G and a channel selection dial 6F that is used in the FM radio mode. A channel display section 6H includes a memory unit that moves in directions indicated by arrows in FIG. 3 in accordance with a rotation operation of the channel selection dial 6F, and indicates a channel selection status in the FM reception unit 3.

Here, the volume adjustment dial 6G and the channel selection dial 6F are provided. This configuration is an example, and those dials may be replaced by slide keys that are slid, or so-called jog dials that can be rotated and pressed. Also, an operation based on detection of electrostatic capacity is acceptable.

Next, a description will be given about the case of listening to FM broadcast or played back sound provided from the mobile phone terminal 200A by using the audio playback apparatus 100A according to the first embodiment. First, a description will be given about the case of listening to FM broadcast by using the audio playback apparatus 100A.

After turning on the power by operating the power on/off switch 6A, a user operates the mode switch 6E to set the audio playback apparatus 100A to the FM radio mode. In this case, the switch circuit 9 is switched to the FM reception unit 3 side in accordance with the operation of the mode switch 6E. Accordingly, FM broadcast signals received through the cable of the earphone 150 connected to the connection terminal 5 are supplied to the FM reception unit 3.

The FM reception unit 3 receives the FM broadcast signals supplied thereto, selects a signal of a certain channel from among the FM broadcast signals, and demodulates the selected signal to generate an audio signal corresponding to the selected FM broadcast signal, and supplies the audio signal to the amplifier 4 through the switch circuit 9. The amplifier 4 amplifies the audio signal supplied thereto and supplies the amplified signal to the earphone 150 connected to the connection terminal 5.

In this case, the volume can be adjusted by rotating the volume adjustment dial 6G, and the selected channel can be changed by rotating the channel selection dial 6F. In this way, the user can listen to the sound corresponding to the FM broadcast signal that is received and selected through the FM reception unit 3.

Next, a description will be given about the case of listening to the sound corresponding to an audio signal supplied from the mobile phone terminal 200A by using the audio playback apparatus 100A according to the first embodiment. First, a user operates the mode switch 6E to set the audio playback apparatus 100A to the headset mode. In this case, the switch circuit 9 is switched to the D/A converter 8 side in accordance with the operation of the mode switch 6E. Accordingly, a path to the near field wireless communication unit 2, the D/A converter 8, and the amplifier 4 is connected.

Then, the user provides an instruction to start playing back target music data to the mobile phone terminal 200A through the operation unit 221. Accordingly, the control unit 220 of the mobile phone terminal 200A reads the target audio data from the memory 231 and transmits the audio data through the near field wireless communication unit 232 and the transmission/reception antenna 233.

In the audio playback apparatus 100A, the audio data transmitted from the mobile phone terminal 200A is received through the transmission/reception antenna 1 and the near field wireless communication unit 2. Then, if the received audio data is compressed, the near field wireless communication unit 2 decompresses the audio data to generate audio data to be played back by using the function of the ACPU 7 and supplies the audio data to the D/A converter 8.

The D/A converter 8 converts the audio data to be played back supplied from the near field wireless communication unit 2 into an analog audio signal and supplies the audio signal to the amplifier 4 through the switch circuit 9. The amplifier 4 amplifies the audio signal supplied thereto and supplies the amplified audio signal to the earphone 150 connected to the connection terminal 5. In this way, the user can listen to the sound corresponding to the played back audio data supplied from the mobile phone terminal 200A received through the near field wireless communication unit 2.

In this case, the volume can be adjusted by rotating the volume adjustment dial 6G. In the headset mode, a process of playing back audio data in the mobile phone terminal 200A can be controlled by operating the fast-forward key 6B, the fast-rewind key 6C, and the playback/stop key 6D.

That is, the ACPU 7 generates a request signal (command) corresponding to input of an operation accepted through the fast-forward key 6B, the fast-rewind key 6C, or the playback/stop key 6D, and transmits the request signal to the mobile phone terminal 200A through the near field wireless communication unit 2 and the transmission/reception antenna 1.

The mobile phone terminal 200A receives the request signal (command) transmitted from the audio playback apparatus 100A through the transmission/reception antenna 233 and the near field wireless communication unit 232, and supplies the request signal to the control unit 220. Accordingly, the control unit 220 can execute a process in accordance with the received request signal, for example, start reading target audio data from the memory 231, stop reading data, fast-forward, or fast-rewind.

Operation of Audio Playback Apparatus 100A

Figure 4:
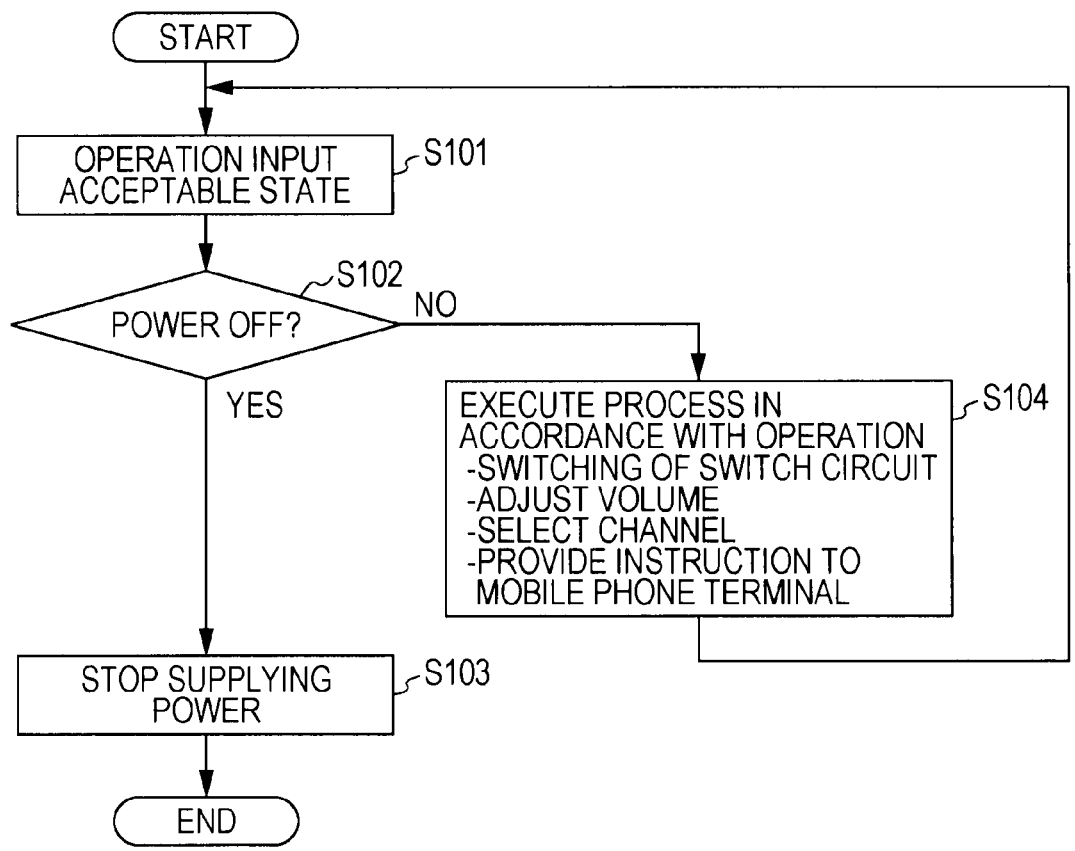
FIG. 4 is a flowchart for explaining operation of the audio playback apparatus according to the first embodiment.

Next, operation of the audio playback apparatus 100A according to the first embodiment will be described. FIG. 4 is a flowchart for explaining operation of the audio playback apparatus 100A according to the first embodiment.

As described above, in the audio playback apparatus 100A according to the first embodiment, software control is hardly performed. Thus, it is basically difficult to illustrate the operation of the audio playback apparatus 100A in a flowchart. However, the operation of the audio playback apparatus 100A is illustrated in the flowchart in FIG. 4 in order to exhibit the feature of the audio playback apparatus 100A.

As described above, when the power is turned on with an operation of the power on/off switch 6A, the audio playback apparatus 100A enters an operation input acceptable state (step S101), so that input of various operations can be performed through the operation unit 6.

Here, when the power on/off switch 6A is operated again to turn off the power (step S102), power supply to the individual units is stopped (step S103), so that the audio playback apparatus 100A enters a non-operation state.

When an operation other than an operation of turning off the power is performed, a circuit unit concerned executes a process in accordance with the operation performed by the user (step S104). That is, in step S104, when the mode switch 6E is operated, the switch circuit 9 is switched. When the volume adjustment dial 6G is operated, the gain of the amplifier 4 is changed to adjust the volume.

In step S104, when the channel selection dial 6F is operated in the FM radio mode, the selected channel is changed in the FM reception unit 3. When the fast-forward key 6B, the fast-rewind key 6C, or the playback/stop key 6D is operated, the ACPU 7 generates a request signal corresponding to the operation and transmits the request signal to the mobile phone terminal 200A through the near field wireless communication unit 2. After step S104, the process returns to step S101, where input of an operation can be performed on the audio playback apparatus 100A.

As described above, in the audio playback apparatus 100A according to the first embodiment, the function of receiving FM broadcast signals completes in the audio playback apparatus 100A, and the mobile phone terminal 200A has no involvement in the function of receiving FM broadcast signals.

However, played back sound supplied from the mobile phone terminal 200A or a program of FM radio broadcast can be listened to through the audio playback apparatus 100A. That is, with the use of the audio playback apparatus 100A, the user can listen to the sound corresponding to an audio signal transmitted through near field wireless communication, and also listen to the sound corresponding to an FM broadcast signal. Furthermore, the audio playback apparatus 100A may have a very simple configuration.

Second Embodiment

Next, a second embodiment of the present invention will be described. The second embodiment described below is a second embodiment in which the function of receiving FM radio broadcast completes in the audio playback apparatus 100 and in which the mobile phone terminal 200 has no involvement in the function of receiving FM radio broadcast.

Example of Configuration of Apparatus

Figure 5:
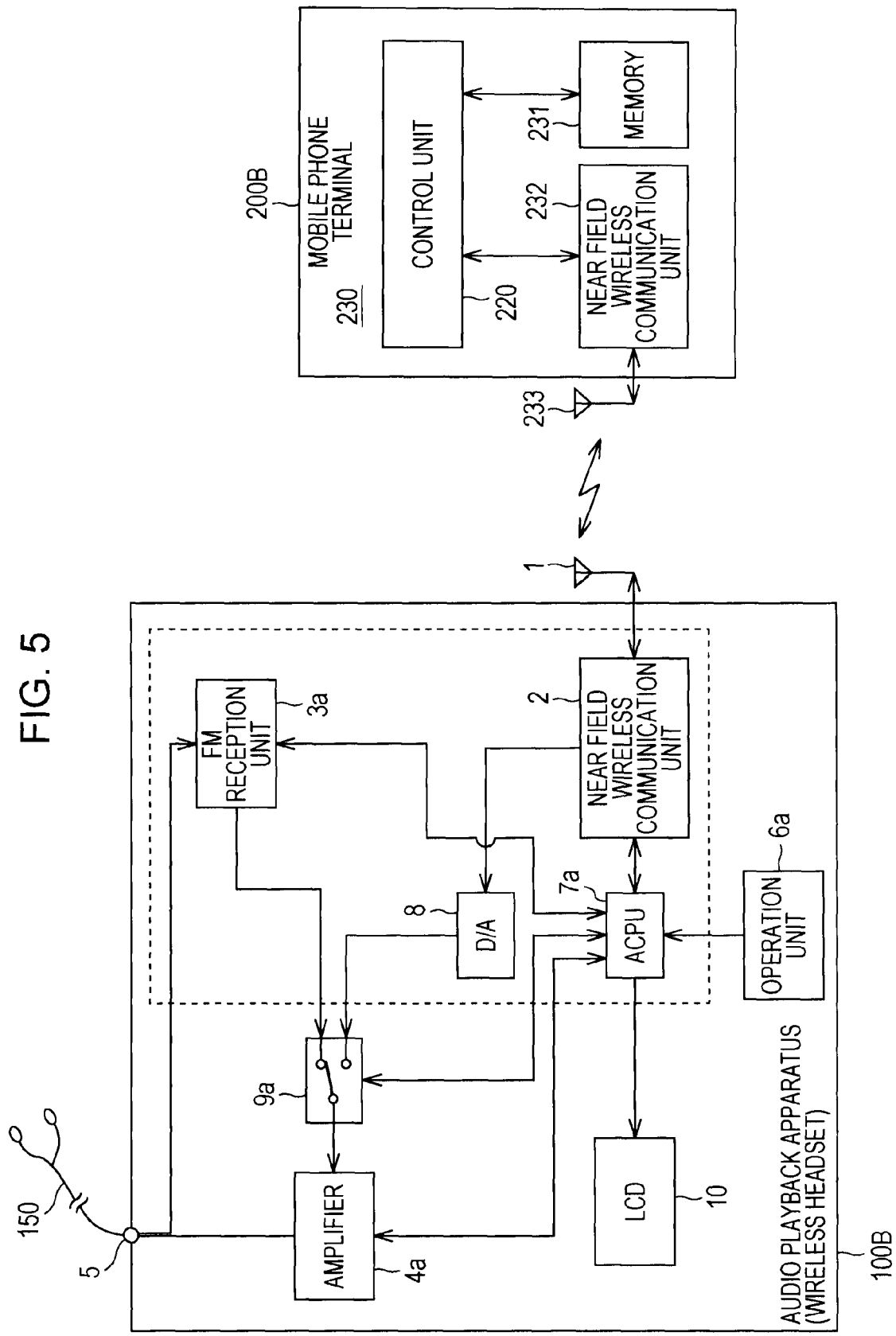
FIG. 5 is a block diagram for explaining an audio playback apparatus according to a second embodiment.

FIG. 5 is a block diagram for explaining an audio playback apparatus 100B according to the second embodiment. Referring to FIG. 5, a mobile phone terminal 200B that supplies audio signals to the audio playback apparatus 100B has a configuration similar to that of the mobile phone terminal 200 illustrated in FIG. 1. Thus, in the second embodiment, too, the part related to audio playback of the mobile phone terminal 200B is illustrated, and illustration of the other part of the mobile phone terminal 200B is omitted in FIG. 5 for simple explanation.

The audio playback apparatus 100B illustrated in FIG. 5 corresponds to the audio playback apparatus 100 illustrated in FIG. 1 and has elements almost similar to those of the audio playback apparatus 100A according to the first embodiment illustrated in FIG. 2.

That is, as illustrated in FIG. 5, the audio playback apparatus 100B according to the second embodiment includes the transmission/reception antenna 1, the near field wireless communication unit 2, an FM reception unit 3a, an amplifier 4a, the connection terminal 5, an operation unit 6a, an ACPU 7a, the D/A converter 8, a switch circuit 9a, and an LCD 10.

Each of the transmission/reception antenna 1, the near field wireless communication unit 2, the connection terminal 5, and the D/A converter 8, which are denoted by the same reference numerals as those in the audio playback apparatus 100A according to the first embodiment illustrated in FIG. 2, has a configuration similar to that of the corresponding element of the audio playback apparatus 100A according to the first embodiment.

The FM reception unit 3a, the amplifier 4a, the operation unit 6a, the ACPU 7a, and the switch circuit 9a have functions similar to those of the FM reception unit 3, the amplifier 4, the operation unit 6, the ACPU 7, and the switch circuit 9, respectively, of the audio playback apparatus 100A according to the first embodiment illustrated in FIG. 2.

Thus, the explanation about basic functions of the transmission/reception antenna 1, the near field wireless communication unit 2, the FM reception unit 3a, the amplifier 4a, the connection terminal 5, the operation unit 6, the ACPU 7a, the D/A converter 8, and the switch circuit 9a of the audio playback apparatus 100B illustrated in FIG. 5 corresponds to that in the foregoing first embodiment, and is thus omitted here.

Also, the audio playback apparatus 100B according to the second embodiment includes the LCD 10. The LCD 10 is controlled by the ACPU 7a and is capable of displaying various pieces of character information, symbol information, and graphic information.

In the audio playback apparatus 100B according to the second embodiment, the FM reception unit 3a, the amplifier 4a, and the switch circuit 9a with a suffix "a" are controlled by the ACPU 7a. Thus, the ACPU 7a of the audio playback apparatus 100B according to the second embodiment is slightly different from the ACPU 7 of the audio playback apparatus 100A according to the first embodiment illustrated in FIG. 2, and has a function of controlling a unit concerned in accordance with input of an operation accepted through the operation unit 6a.

The operation unit 6a accepts input of various operations from a user. However, the operation unit 6a does not supply an operation signal corresponding to an operation to a unit concerned unlike the operation unit 6 according to the first embodiment. The operation unit 6a is capable of generating an electric signal corresponding to input of an operation accepted from a user and supplying the electric signal to the ACPU 7a.

In the audio playback apparatus 100A according to the second embodiment illustrated in FIG. 5, the near field wireless communication unit 2, the FM reception unit 3a, the ACPU 7a, and the A/D converter 8 surrounded by a broken line are packaged into a single chip to constitute an integrated circuit.

In the audio playback apparatus 100B according to the second embodiment, each of the FM reception unit 3a, the amplifier 4a, and the switch circuit 9a is controlled through the ACPU 7a. That is, each of the FM reception unit 3a, the amplifier 4a, and the switch circuit 9a can be controlled by software.

In the audio playback apparatus 100B according to the second embodiment, too, a user can easily listen to played back sound supplied from the mobile phone terminal 200B and a program of FM radio broadcast.

Operation Method and Operation of Apparatus

Figure 6:
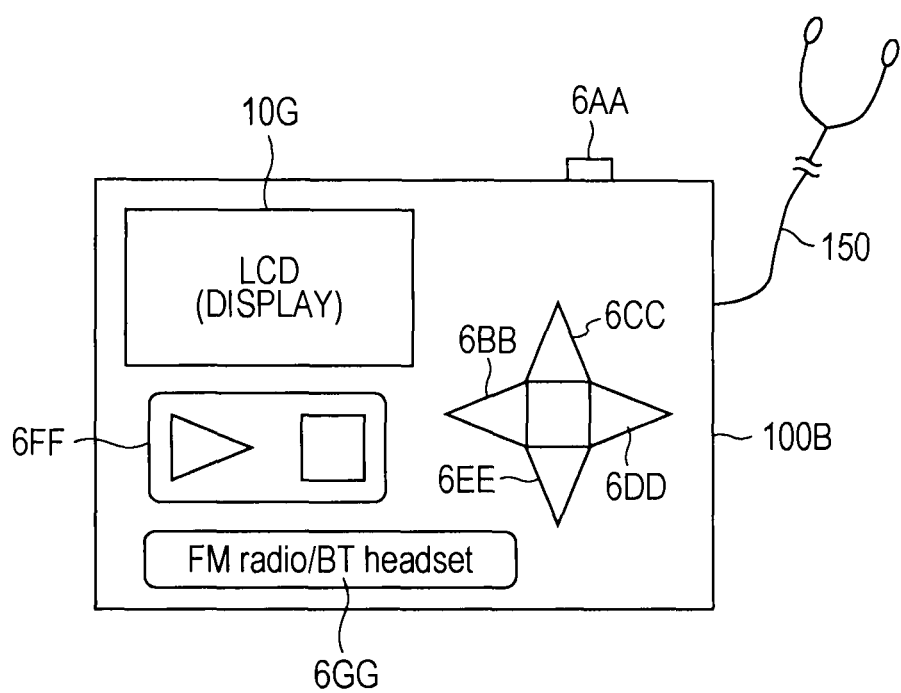
FIG. 6 is a diagram illustrating an example of an appearance of the audio playback apparatus according to the second embodiment.

Next, an operation method and operation of the audio playback apparatus 100B according to the second embodiment will be described. FIG. 6 is a diagram illustrating an example of an appearance of the audio playback apparatus 100B according to the second embodiment. As illustrated in FIG. 6, the audio playback apparatus 100B according to the second embodiment includes a power on/off switch 6AA.

Also, the audio playback apparatus 100B includes an up key 6CC and a down key 6DD for adjusting volume. Also, the audio playback apparatus 100B includes a left arrow key 6BB and a right arrow key 6DD that are used as channel selection keys in the FM radio mode and that are used as a fast-forward key and a fast-rewind key in the headset mode.

Furthermore, the audio playback apparatus 100B includes an operation key 6FF that is used as a playback key and a stop key in the headset mode. Also, the audio playback apparatus 100B includes a mode switch 6GG. The mode switch 6GG is used for inputting a switch instruction to the switch circuit 9a.

In the second embodiment, too, the FM radio mode is a mode for playing back FM broadcast signals received through the FM reception unit 3a. The headset mode is an audio playback mode according to the related art for playing back an audio signal received from the mobile phone terminal 200 through the near field wireless communication unit 2.

Various pieces of information based on operation statuses are displayed on a display screen 10G of the LCD 10. Examples of the various pieces of information include a mode that is currently selected, information representing whether playback is being performed or not, volume, remaining power of battery, the name of a broadcast station, the frequency of a selected channel, and the name of a song. Here, the mode, volume, and remaining power of battery can be constantly displayed. The name of a broadcast station and the frequency of a selected channel can be displayed in the FM radio mode. Information representing whether playback is being performed or not and the name of a song can be displayed in the headset mode.

Also, in the audio playback apparatus 100B according to the second embodiment, too, the volume adjustment key and the channel selection key may have configurations similar to those in the audio playback apparatus 100A according to the first embodiment. That is, the volume adjustment key and the channel selection key may have various forms, for example, the form of a dial, a slide key, or a so-called jog dial. Alternatively, an operation based on detection of electrostatic capacity may be accepted.

Next, a description will be given about the case of listening to FM broadcast or played back sound provided from the mobile phone terminal 200B by using the audio playback apparatus 100B according to the second embodiment. First, a description will be given about the case of listening to FM broadcast by using the audio playback apparatus 100B.

After turning on the power by operating the power on/off switch 6AA, a user operates the mode switch 6GG to set the audio playback apparatus 100B to the FM radio mode. In this case, the ACPU 7a controls the switch circuit 9a to switch the switch circuit 9a to the FM receiver unit 3a side. Accordingly, FM broadcast signals received through the cable of the earphone 150 connected to the connection terminal 5 are supplied to the FM reception unit 3a.

The FM reception unit 3a receives the FM broadcast signals supplied thereto, selects a signal of a certain channel from among the signals, and demodulates the selected signal, thereby generating an audio signal corresponding to the selected FM broadcast signal, and supplies the audio signal to the amplifier 4*a* through the switch circuit 9*a*. The amplifier 4*a* amplifies the audio signal supplied thereto and supplies the amplified audio signal to the earphone 150 connected to the connection terminal 5.

In this case, when the up key 6CC or the down key 6DD is operated, the ACPU 7*a* controls the gain of the amplifier 4*a* in accordance with the operation, so that the volume can be adjusted. Also, at this time, when the left arrow key 6BB or the right arrow key 6DD is operated, the ACPU 7*a* controls the channel selection circuit (local oscillation unit) of the FM reception unit 3*a* in accordance with the operation, so that the selected channel can be changed. In this way, the user can listen to the sound corresponding to the FM broadcast signal that is received and selected through the FM reception unit 3*a*.

Next, a description will be given about the case of listening to played back sound provided from the mobile phone terminal 200B by using the audio playback apparatus 100B according to the second embodiment. First, a user operates the mode switch 6GG to set the audio playback apparatus 100B to the headset mode.

In this case, the ACPU 7*a* controls the switch circuit 9*a* to switch the switch circuit 9*a* to the D/A converter 8 side. Accordingly, a path to the near field wireless communication unit 2, the D/A converter 8, and the amplifier 4*a* is connected.

Then, the user provides an instruction to start playing back target music data or the like to the mobile phone terminal 200B through the operation unit 221. Accordingly, the control unit 220 of the mobile phone terminal 200B reads the target audio data from the memory 231 and transmits the audio data through the near field wireless communication unit 232 and the transmission/reception antenna 233.

The audio playback apparatus 100B receives the audio data transmitted from the mobile phone terminal 200B through the transmission/reception antenna 1 and the near field wireless communication unit 2. Then, if the received audio data is compressed, the near field wireless communication unit 2 decompresses the audio data to generate audio data to be played back by using the function of the ACPU 7*a*, and supplies the audio data to the D/A converter 8.

The D/A converter 8 converts the audio data to be played back supplied from the near field wireless communication unit 2 into an analog audio signal and supplies the audio signal to the amplifier 4*a* through the switch circuit 9*a*. The amplifier 4 amplifies the audio signal supplied thereto and supplies the amplified audio signal to the earphone 150 connected to the connection terminal 5. In this way, the user can listen to the sound corresponding to the played back audio data received from the mobile phone terminal 200B through the near field wireless communication unit 2.

In this case, when the up key 6CC or the down key 6DD is operated, the ACPU 7*a* controls the gain of the amplifier 4*a* in accordance with the operation, so that the volume can be adjusted. Also, at this time, when the left arrow key 6BB, the right arrow key 6DD, or the operation key 6FF is operated, a process of playing back audio data in the mobile phone terminal 200B can be controlled.

That is, the ACPU 7*a* generates a request signal (command) based on input of an operation accepted through the left arrow key 6BB, the right arrow key 6DD, or the operation key 6FF, and transmits the request signal to the mobile phone terminal 200B through the near field wireless communication unit 2 and the transmission/reception antenna 1.

The mobile phone terminal 200B receives the request signal (command) transmitted from the audio playback apparatus 100A through the transmission/reception antenna 233 and the near field wireless communication unit 232, and supplies the request signal to the control unit 220. In response to the received request signal, the control unit 220 can execute a corresponding process, for example, start or stop reading target audio data from the memory 231, fast-forward, or fast-rewind.

Operation of Audio Playback Apparatus 100B

Figure 7:
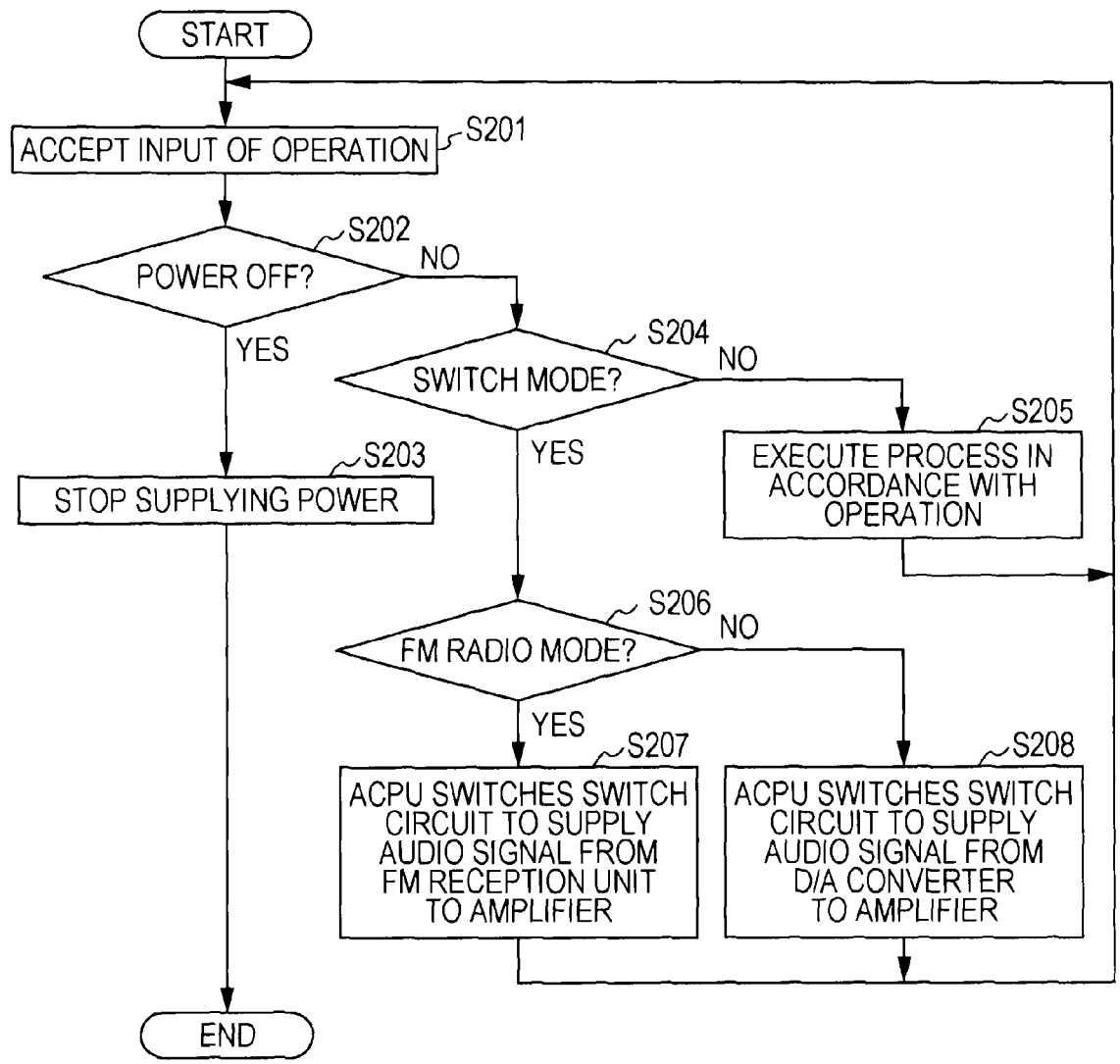
FIG. 7 is a flowchart for explaining operation of the audio playback apparatus according to the second embodiment.

Next, operation of the audio playback apparatus 100B according to the second embodiment will be described. FIG. 7 is a flowchart for explaining the operation of the audio playback apparatus 100B according to the second embodiment.

As described above, in the audio playback apparatus 100B according to the second embodiment, the ACPU 7*a* controls the individual units in accordance with input of an operation accepted from a user through the operation unit 6*a*, so that the user can listen to played back sound.

Thus, the operation of the audio playback apparatus 100B according to the second embodiment is regarded as the operation of the ACPU 7*a* of the audio playback apparatus 100B, which is illustrated in the flowchart in FIG. 7. That is, the process illustrated in FIG. 7 is executed by the ACPU 7*a* when the power on/off switch 6AA is operated and the power of the audio playback apparatus 100B is turned on.

When the power is turned on, the ACPU 7*a* accepts input of an operation from a user through the operation unit 6*a* (step S201). After accepting the operation in step S201, the ACPU 7*a* determines whether the accepted operation is an operation of turning off the power through the power on/off key 6AA (step S202).

If it is determined in step S202 that the accepted operation is an operation of turning off the power, the ACPU 7*a* stops supplying power to the individual units (step S203), and ends the process illustrated in FIG. 7. Accordingly, the audio playback apparatus 100B enters a non-operation state.

If it is determined in step S202 that the accepted operation is not an operation of turning off the power, the ACPU 7*a* determines whether the accepted operation is a mode switching operation performed through the mode switch 6GG (step S204).

If it is determined in step S204 that the accepted operation is not a mode switching operation, the ACPU 7*a* executes a process in accordance with the accepted operation by controlling the individual units (step S205).

In step S205, volume adjustment, selection of a channel in the FM radio mode, or a process of instructing the mobile phone terminal 200B to perform playback, stop, fast-forward, or fast-rewind in the headset mode is performed. After step S205, the process is repeated from step S201, and input of a further operation can be performed.

If it is determined in step S204 that the accepted operation is a mode switching operation, the ACPU 7*a* determines whether the accepted operation is an operation of switching to the FM radio mode (step S206).

If it is determined in step S206 that the accepted operation is an operation of switching to the FM radio mode, the ACPU 7*a* switches the switch circuit 9*a* so that the audio signal supplied from the FM reception unit 3*a* is supplied to the amplifier 4*a* (step S207).

Accordingly, the user can listen to the played back sound corresponding to the FM broadcast signal that is demodulated after being selected from among received FM broadcast signals through the FM reception unit 3*a*. After that, the process is repeated from step S201, and input of a further operation can be performed.

If it is determined in step S206 that the accepted operation is not an operation of switching to the FM radio mode, the ACPU 7a switches the switch circuit 9a so that the audio signal supplied from the D/A converter 9a is supplied to the amplifier 4a (step S208).

Accordingly, the user can listen to the played back sound corresponding to the audio data received from the mobile phone terminal 200B through the near field wireless communication unit 2. After that, the process is repeated from step S201, and input of a further operation can be performed.

As described above, in the audio playback apparatus 100B according to the second embodiment, the function of receiving FM radio broadcast completes in the audio playback apparatus 100B, and the mobile phone terminal 200B has no involvement in the function of receiving FM radio broadcast, as in the audio playback apparatus 100A according to the first embodiment.

However, the user can listen to the played back sound supplied from the mobile phone terminal 200B and a program of FM radio broadcast through the audio playback apparatus 100B. That is, with the use of the audio playback apparatus 100B, the user can listen to the sound corresponding to an audio signal transmitted through near field wireless communication and the sound corresponding to an FM broadcast signal.

In this case, the ACPU 7a controls the individual units in accordance with input of an operation from the user. Thus, various processes are performed by software and operation keys can be set relatively freely, so that the flexibility in development can be ensured. Also, user-friendliness can be increased. Furthermore, control performed by the ACPU 7a enables necessary information to be displayed on the display screen of the LCD 10 to provide the information to the user.

Third Embodiment

Next, a third embodiment of the present invention will be described. In the third embodiment described below, necessary information is transmitted/received between the audio playback apparatus 100 and the mobile phone terminal 200, so that the mobile phone terminal 200 that does not have an FM reception unit operates as if it has the FM reception unit.

That is, in the third embodiment, the audio playback system according to an embodiment of the present invention is applied to a system including an audio playback apparatus 100C and a mobile phone terminal 200C. Also, the audio playback apparatus according to an embodiment of the present invention is applied to the audio playback apparatus 100C according to the third embodiment.

Also, the control program for an audio playback apparatus according to an embodiment of the present invention is applied to the program executed by the audio playback apparatus 100C according to the third embodiment. Furthermore, the audio playback apparatus usage program according to an embodiment of the present invention is applied to the program executed by the mobile phone terminal 200C according to the third embodiment.

Example of Configuration of Apparatus

Figure 8:
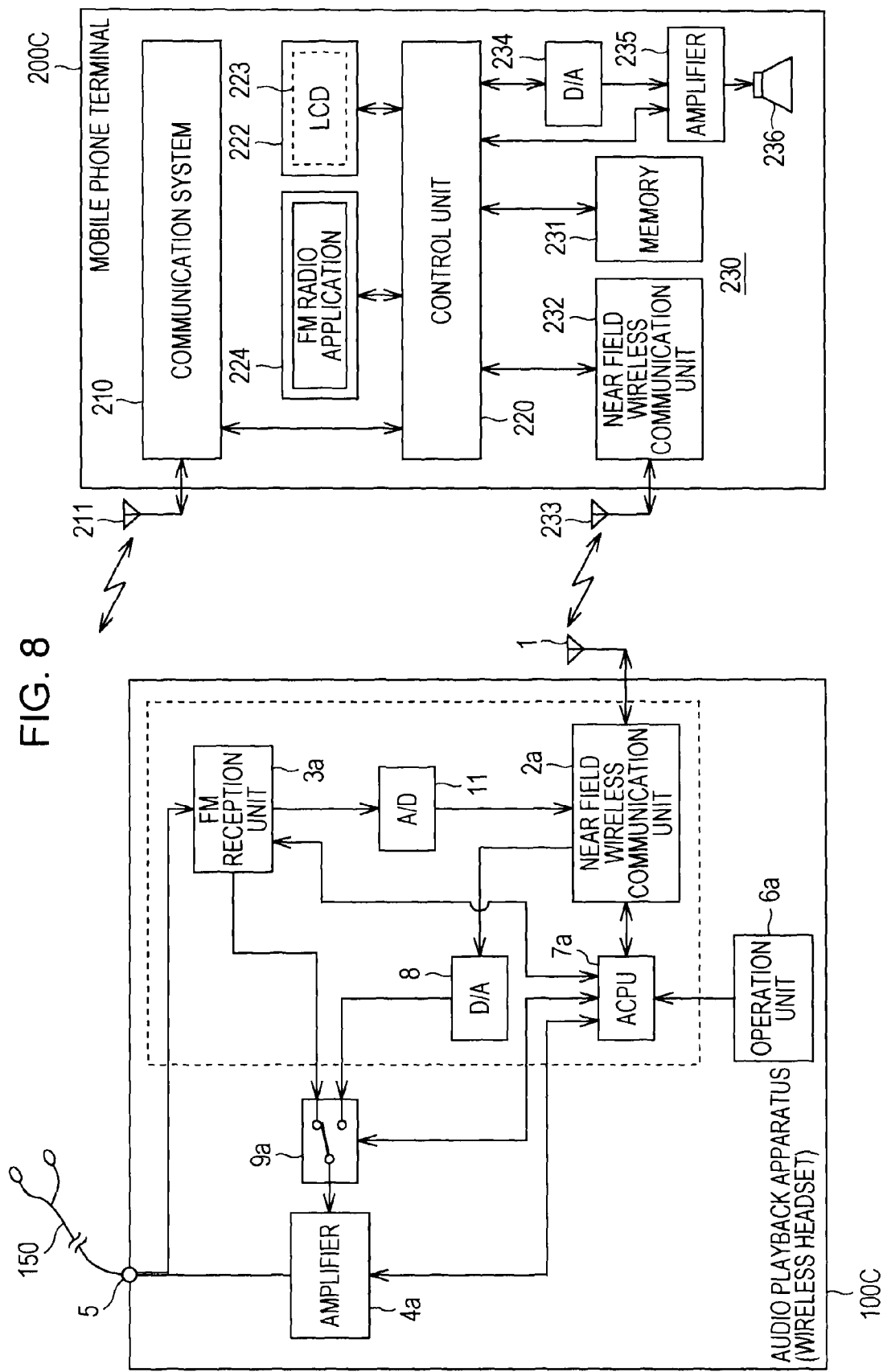
FIG. 8 is a block diagram for explaining an audio playback apparatus and a mobile phone terminal according to a third embodiment.

FIG. 8 is a block diagram for explaining the audio playback apparatus 100C and the mobile phone terminal 200C according to the third embodiment. In FIG. 8, the mobile phone terminal 200C that supplies audio signals to the audio playback apparatus 100C has a configuration substantially similar to that of the mobile phone terminal 200 illustrated in FIG. 1.

Thus, in the third embodiment, too, a main part of the mobile phone terminal 200C is illustrated and the other part of the mobile phone terminal 200C is omitted in FIG. 8 for simple explanation. In the mobile phone terminal 200C according to the third embodiment, an FM radio application 224 illustrated with double lines in FIG. 8 can be executed by the control unit 220.

Although the details will be described below, the FM radio application 224 is software (program) for using the FM radio reception function of the audio playback apparatus 100C in the manner that the function is held by the mobile phone terminal 200C.

The audio playback apparatus 100C illustrated in FIG. 8 corresponds to the audio playback apparatus 100 illustrated in FIG. 1 and has elements substantially similar to those of the audio playback apparatus 100B according to the second embodiment illustrated in FIG. 5.

Thus, in the audio playback apparatus 100C according to the third embodiment illustrated in FIG. 8, the parts having configurations similar to those in the audio playback apparatus 100B according to the second embodiment are denoted by the same reference numerals, and the detailed description thereof will be omitted.

The audio playback apparatus 100C according to the third embodiment enables a user to listen to played back sound supplied from the mobile phone terminal 200C and listen to a program of FM radio broadcast. That is, the audio playback apparatus 100C is capable of playing back the sound corresponding to an FM broadcast signal supplied from the FM reception unit 3a. Also, the audio playback apparatus 100C is capable of receiving audio data transmitted from the mobile phone terminal 200C through near field wireless communication via the near field wireless communication unit 2 and playing back the sound corresponding to the audio data.

Furthermore, in the third embodiment, an instruction provided from a user to the audio playback apparatus 100C is accepted by the mobile phone terminal 200C that executes the FM radio application 224. The mobile phone terminal 200C generates a request signal or a control signal in accordance with the accepted instruction to the audio playback apparatus 100C and supplies the request signal or control signal to the audio playback apparatus 100C through near field wireless communication via the near field wireless communication unit 232.

Accordingly, in the audio playback apparatus 100C according to the third embodiment, the ACPU 7a is capable of switching the switch circuit 9a, causing the FM reception unit 3a to change the channel, and adjusting the gain of the amplifier 4a to change the volume on the basis of the request signal or control signal supplied from the mobile phone terminal 200C.

Therefore, the control program executed by the ACPU 7a of the audio playback apparatus 100C according to the third embodiment is different from the program that is executed by the ACPU 7a of the audio playback apparatus 100B according to the second embodiment.

Also, in the operation unit 6a of the audio playback apparatus 100C, a power on/off switch is desirable, but various operation keys are unnecessary unlike in the operation unit 6a of the audio playback apparatus 100B according to the second embodiment. Of course, the operation unit 6a of the audio playback apparatus 100C according to the third embodiment may have a configuration similar to that of the operation unit 6a of the audio playback apparatus 100B according to the second embodiment.

In the audio playback apparatus 100C according to the third embodiment, the ACPU 7a is capable of obtaining information representing the status of the switch circuit 9a, the channel selection status of the FM reception unit 3a, the status of the gain of the amplifier 4a, and the like, and transmitting the information to the mobile phone terminal 200C through the near field wireless communication unit 2. Accordingly, the mobile phone terminal 200C is capable of obtaining necessary information in the audio playback apparatus 100C and displaying the information on the display screen of the LCD 222 to provide it to a user.

Also, as illustrated in FIG. 8, the audio playback apparatus 100C according to the third embodiment includes an A/D converter 11 that receives an audio signal supplied from the FM reception unit 3a and that converts the audio signal into a digital signal. Accordingly, an audio signal of an FM radio broadcast program that is demodulated after being selected from among signals received by the FM reception unit 3a can be transmitted to the mobile phone terminal 200C through the near field wireless communication unit 2a. In this point, the near field wireless communication unit 2a is different from the near field wireless communication unit 2 of the audio playback apparatuses 100A and 100B according to the first and second embodiments.

In this case, the mobile phone terminal 200C receives the audio signal corresponding to an FM broadcast signal (audio signal of an FM broadcast program) transmitted from the audio playback apparatus 100C through the near field wireless communication unit 232. Then, the received audio signal can be processed for playback by the control unit 220 and can be supplied to the loudspeaker 236 through the D/A converter 234 and the amplifier 235 so as to be played back.

In this way, the audio playback apparatus 100C and the mobile phone terminal 200C according to the third embodiment mutually transmit/receive information, so that the function of the audio playback apparatus 100C can be used through the mobile phone terminal 200C.

Operation Method and Operation of Apparatuses

Next, a description will be given about an operation method and operation of the audio playback apparatus 100C and the mobile phone terminal 200C according to the third embodiment. As described above, in the audio playback system according to the third embodiment, the audio playback apparatus 100C can be controlled from the mobile phone terminal 200C when a user operates the mobile phone terminal 200C. Thus, operation other than turning on/off the power is hardly performed on the audio playback apparatus 100C.

Here, a description will be given by associating operation performed by a user on the mobile phone terminal 200C with operation of the audio playback apparatus 100C and the mobile phone terminal 200C. First, a description will be given about the case of listening to FM radio broadcast by using the audio playback apparatus 100C according to the third embodiment.

Figure 9:
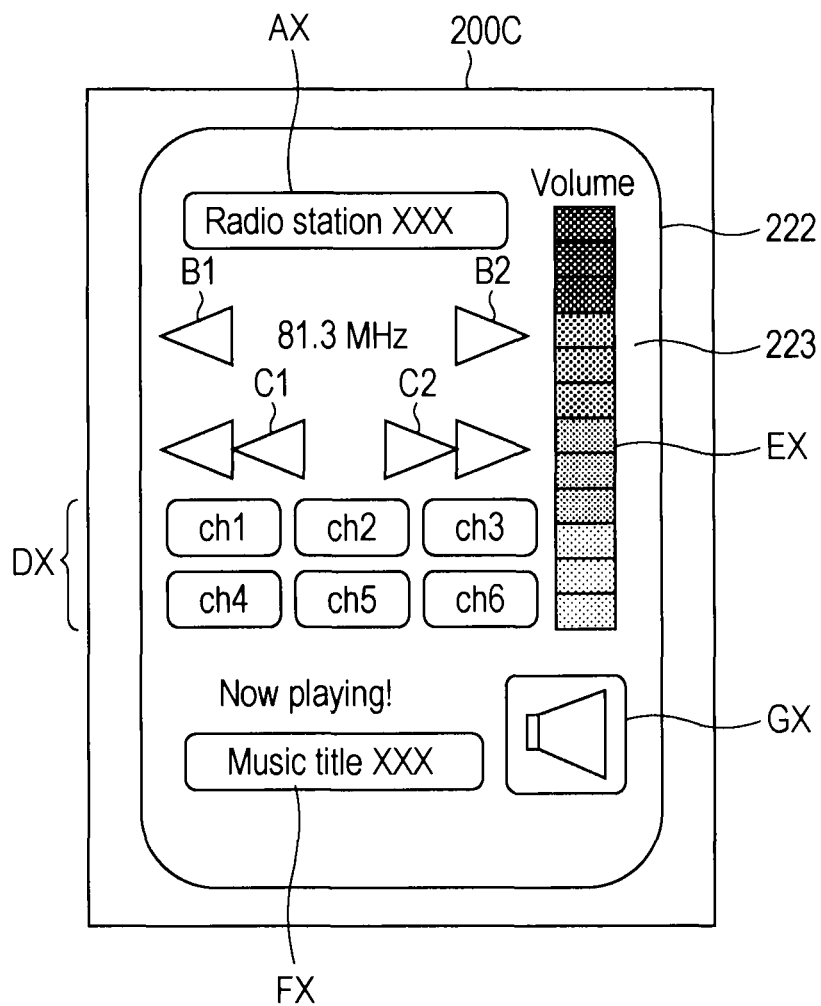
FIG. 9 is a diagram for explaining an operation screen (operation panel) that is displayed on a display screen of an LCD of the mobile phone terminal according to the third embodiment during execution of an FM radio application.

FIG. 9 is a diagram for explaining an operation screen (operation panel) that is displayed on the display screen of the LCD 222 of the mobile phone terminal 200C according to the third embodiment during execution of the FM radio application 224. The mobile phone terminal 200C according to the third embodiment has a configuration of a so-called smart phone. As described above, the mobile phone terminal 200C includes the LCD 222 having a large display screen, and the touch panel 223 is provided on the display screen of the LCD 222. The information displayed on the display screen of the LCD 222 and the touch panel 223 realize the function of the operation unit.

In the mobile phone terminal 200C according to the third embodiment, when an item of FM radio application is selected from a menu displayed on the LCD 222, the control unit 220 executes the FM radio application (software) 224.

In this case, the control unit 220 of the mobile phone terminal 200C generates a control signal for playing back an audio signal supplied from the FM reception unit 3a and transmits the control signal to the audio playback apparatus 100C through the near field wireless communication unit 232 and the transmission/reception antenna 233.

The control signal is received through the transmission/reception antenna 1 and the near field wireless communication unit 2a of the audio playback apparatus 100C and is supplied to the ACPU 7a. Then, the ACPU 7a controls the switch circuit 9a to be switched to the FM reception unit 3a side in accordance with the control signal.

Accordingly, the audio signal corresponding to an FM broadcast signal that is demodulated after being selected from among FM broadcast signals received by the FM reception unit 3a is supplied to the amplifier 4a through the switch circuit 9a. Then, the audio signal amplified by the amplifier 4a is supplied to the earphone 150 connected to the connection terminal 5 through the connection terminal 5, so that the user can listen to the sound corresponding to the audio signal of an FM radio broadcast program.

Also, the control unit 220 of the mobile phone terminal 200C generates a request for providing information, such as selected channel frequency information, volume information, and information about the name of a song multiplexed on an FM broadcast signal that is received and selected, and transmits the request to the audio playback apparatus 100C through the near field wireless communication unit 232 and the transmission/reception antenna 233.

The request is received through the transmission/reception antenna 1 and the near field wireless communication unit 2a of the audio playback apparatus 100C and is supplied to the ACPU 7a. Then, the ACPU 7a obtains selected channel frequency information from the FM reception unit 3a, volume information from the amplifier 4a, and information representing the name of a broadcasted song multiplexed on the received FM broadcast signal.

In this case, information about the name of a song and the like is extracted from a digitalized FM broadcast signal supplied to the ACPU 7a through a path including the FM reception unit 3a, the A/D converter 11, and the near field wireless communication unit 2a.

Then, the selected channel frequency information, volume information, and information about the name of a broadcasted song obtained by the ACPU 7a are transmitted from the audio playback apparatus 100C to the mobile phone terminal 200C through the near field wireless communication unit 2a and the transmission/reception antenna 1.

The mobile phone terminal 200C receives, from the audio playback apparatus 100C, the selected channel frequency information, volume information, and information about the name of a song through the transmission/reception antenna 233 and the near field wireless communication unit 232 and supplies them to the control unit 220. The control unit 220 executes the FM radio application 224, as described above, and displays the operation panel for the FM radio application 224 illustrated in FIG. 9 on the display screen of the LCD 222 by using the received information.

In FIG. 9, an area AX is an area for displaying the name of a broadcast station based on the selected channel frequency information supplied from the audio playback apparatus 100C. An EEPROM (not illustrated) of the control unit 220 of the mobile phone terminal 200C holds a broadcast station list that mutually associates selected channel frequency information, the names of broadcast stations, and the uniform resource locators (URLs) of the web pages of the broadcast stations. Thus, the control unit 220 of the mobile phone terminal 200C extracts the name of a broadcast station by referring to the broadcast station list on the basis of the selected channel frequency information supplied from the audio playback apparatus 100C and displays the name of the broadcast station in the area AX.

In FIG. 9, "81.3 MHz" is information corresponding to the selected channel frequency information provided from the audio playback apparatus 100C. Also, channel selection keys B1 and B2 are displayed on both sides of the display area of the selected channel frequency. Also, detailed channel selection keys C1 and C2 that are used for finely selecting a channel are displayed below the channel selection keys B1 and B2. Each of the detailed channel selection keys C1 and C2 includes two sequential triangles.

Furthermore, a channel key group DX including six channel keys ch1 to ch6, which are associated with frequencies of broadcast stations that are often selected, is displayed below the detailed channel selection keys C1 and C2.

When an operation is performed on the channel selection keys B1 and B2, the detailed channel selection keys C1 and C2, or the channel key group DX, the control unit 220 of the mobile phone terminal 200C generates a channel selection control signal corresponding to the operated key. Then, the control unit 220 transmits the generated channel selection control signal to the audio playback apparatus 100C through the near field wireless communication unit 232 and the transmission/reception antenna 233.

The audio playback apparatus 100C receives the channel selection control signal transmitted from the mobile phone terminal 200C through the transmission/reception antenna 1 and the near field wireless communication unit 2a and supplies the signal to the ACPU 7a. The ACPU 7a controls the FM reception unit 3a in accordance with the channel selection control signal to change the selected channel. Accordingly, the selected channel frequency is changed in the FM reception unit 3a, so that the FM broadcast signal that is received and selected is changed.

Also, a volume meter EX is displayed at the left end of the LCD 222 of the mobile phone terminal 200C. An instruction to adjust the volume can be input by touching the volume meter EX with a finger or the like.

That is, when an operation is performed on the volume meter EX, the control unit 220 of the mobile phone terminal 200C generates a volume control signal to adjust the volume in accordance with the position on the volume meter operated. Then, the control unit 220 transmits the generated volume control signal to the audio playback apparatus 100C through the near field wireless communication unit 232 and the transmission/reception antenna 233.

The audio playback apparatus 100C receives the volume control signal transmitted from the mobile phone terminal 200C through the transmission/reception antenna 1 and the near field wireless communication unit 2a and supplies the signal to the ACPU 7a. The ACPU 7a controls the gain of the amplifier 4a in accordance with the volume control signal to change the volume. Accordingly, the gain of the amplifier 4a is changed, so that the volume of output sound that is listened to through the earphone 150 is changed.

Also, an area FX for displaying related information, such as the title of music that is currently being played back, is displayed at the lower end of the LCD 222 of the mobile phone terminal 200C. Also, a speaker mark GX is displayed on the right side of the area FX.

When an operation is performed on the speaker mark GX, the control unit 220 of the mobile phone terminal 200C generates a request for providing an audio signal of an FM radio broadcast program that is being received by the FM reception unit 3a. Then, the control unit 220 transmits the generated request to the audio playback apparatus 100C through the near field wireless communication unit 232 and the transmission/reception antenna 233.

The audio playback apparatus 100C receives the request transmitted from the mobile phone terminal 200C through the transmission/reception antenna 1 and the near field wireless communication unit 2a, and supplies the request to the ACPU 7a. The ACPU 7a performs a predetermined process, that is, compresses audio data, which corresponds to an audio signal that is demodulated after being selected from among signals received in the FM reception unit 3a, that is converted into a digital signal in the A/D converter 11, and that is supplied to the near field wireless communication unit 2a, thereby generating audio data to be transmitted. Then, the ACPU 7a transmits the audio data to be transmitted to the mobile phone terminal 200C through the near field wireless communication unit 2a and the transmission/reception antenna 1.

The mobile phone terminal 200C receives the audio data transmitted from the audio playback apparatus 100C through the transmission/reception antenna 233 and the near field wireless communication unit 232 and supplies the audio data to the control unit 220. The control unit 220 decompresses the audio data to reconstitute the before-compression audio data, causes the D/A converter 234 to convert the audio data into an analog audio signal, and supplies the analog audio signal to the loudspeaker 236 through the amplifier 235. Accordingly, the user can listen to the sound corresponding to the audio signal of the FM radio broadcast program that is received and selected in the FM reception unit 3a of the audio playback apparatus 100C through the loudspeaker 236 of the mobile phone terminal 200C.

When an operation is performed again on the speaker mark GX, the control unit 220 generates a request for stopping providing the audio signal of the FM radio broadcast program received by the FM reception unit 3a. Then, the control unit 220 transmits the generated request to the audio playback apparatus 100C through the near field wireless communication unit 232 and the transmission/reception antenna 233.

In this case, the audio playback apparatus 100C receives the request from the mobile phone terminal 200C through the transmission/reception antenna 1 and the near field wireless communication unit 2a and supplies the request to the ACPU 7a. Then, the ACPU 7a controls the near field wireless communication unit 2a to stop transmission of the audio signal that is received, selected, and demodulated in the FM reception unit 3a to the mobile phone terminal 200C. Accordingly, playback of the sound corresponding to the audio signal in the mobile phone terminal 200C also stops.

Furthermore, in the third embodiment, when a finger or the like touches the area AX for displaying the name of a broadcast station on the operation panel of the FM radio application displayed in the manner illustrated in FIG. 9, the control unit 220 of the mobile phone terminal 200C reads the URL of the corresponding broadcast station in the foregoing broadcast station list that is stored and held in the EEPROM of the control unit 220. Then, the control unit 220 controls the communication system 210 and accesses the web page of the target broadcast station by using the read URL, so that the user can browse the web page of the broadcast station.

Accordingly, the user can browse various pieces of information about the broadcast station from which an FM broadcast signal is currently being received through the audio playback apparatus 100C, such as a broadcast program list, perform posting, and apply for quiz or present.

Additionally, in the third embodiment, when a finger or the like touches the area FX for displaying related information, such as the name of a song, on the operation panel of the FM radio application displayed in the manner illustrated in FIG. 9, the control unit 220 of the mobile phone terminal 200C reads the URL of the web page of an online shop of music content stored and held in the EEPROM of the control unit 220. Then, the control unit 220 controls the communication system 210 and accesses the web page of the target online shop by using the read URL, so that the user can browse the web page of the online shop.

Accordingly, the user can immediately purchase, through the Internet, digital content of a song that is being broadcasted in the FM radio broadcast program that the user is currently listening to through the audio playback apparatus 100C.

When the user does not know the name of a song that is being broadcasted, the user can search for the name of the song by transmitting part of the audio data of the received song to a predetermined search server. Also, the user can access the Internet through the communication system 210 of the mobile phone terminal 200C while listening to an FM radio broadcast program through the audio playback apparatus 100C in order to browse various web pages or transmit/receive an e-mail.

Next, a description will be given about the case of listening to played back sound provided from the mobile phone terminal 200C by using the audio playback apparatus 100C according to the third embodiment. In the case of the mobile phone terminal 200C according to the third embodiment, when an item of music playback application is selected from the menu displayed on the LCD 222, for example, the music playback application (software) is executed in the control unit 220.

In this case, the control unit 220 of the mobile phone terminal 200C generates a control signal for playing back an audio signal supplied from the mobile phone terminal 200C, and transmits the control signal to the audio playback apparatus 100C through the near field wireless communication unit 232 and the transmission/reception antenna 233.

The control signal is received through the transmission/reception antenna 1 and the near field wireless communication unit 2a of the audio playback apparatus 100C and is supplied to the ACPU 7a. The ACPU 7a controls the switch circuit 9a to be switched to the D/A converter 8 side in accordance with the control signal.

Accordingly, the audio signal corresponding to the played back audio signal that is received from the mobile phone terminal 200C through the near field wireless communication unit 2a and that is converted into an analog audio signal by the D/A converter 8 is supplied to the amplifier 4a through the switch circuit 9a. Then, the audio signal amplified by the amplifier 4a is supplied to the earphone 150 connected to the connection terminal 5 through the connection terminal 5, so that the user can listen to the sound corresponding to the audio signal supplied from the mobile phone terminal 200C.

Then, the control unit 220 of the mobile phone terminal 200C displays the operation panel illustrated in FIG. 6 on the LCD 222, for example. When an operation of adjusting the volume is performed through the touch panel 223, the control unit 220 generates a volume control signal, as described above, and transmits the volume control signal to the audio playback apparatus 100C through the near field wireless communication unit 232 and the transmission/reception antenna 233, thereby adjusting the volume.

When an operation of starting or stopping playback or an operation of performing fast-forward or fast-rewind is performed through the touch panel 223, the control unit 220 of the mobile phone terminal 200C controls itself to control a process of playing back audio data.

As described above, in the audio playback system according to the third embodiment, the audio playback apparatus 100C is controlled from the mobile phone terminal 200C side so that the user can listen to an FM radio broadcast program or played back sound supplied from the mobile phone terminal 200C.

Also, in the audio playback system according to the third embodiment, the user can easily access the web page of a broadcast station of a program that the user is listening to through the mobile phone terminal 200C in order to obtain various pieces of information or to perform posting while listening to the FM radio broadcast program through the audio playback apparatus 100C. Furthermore, the user can easily purchase digital content of music that is being received through FM radio broadcast on the Internet.

That is, the user can obtain information about the FM radio broadcast program that the user is listening to in real time through the Internet by using the mobile phone terminal 200C. Also, the user can easily access the FM radio broadcast program that is being broadcasted through the Internet in order to perform posting, answer a question, or apply for a present.

Operation of Audio Playback System

Next, operation of the audio playback system according to the third embodiment will be described. Specifically, operation of the mobile phone terminal 200C and operation of the audio playback apparatus 100C will be described.

Operation of Mobile Phone Terminal 200C

Figure 10:
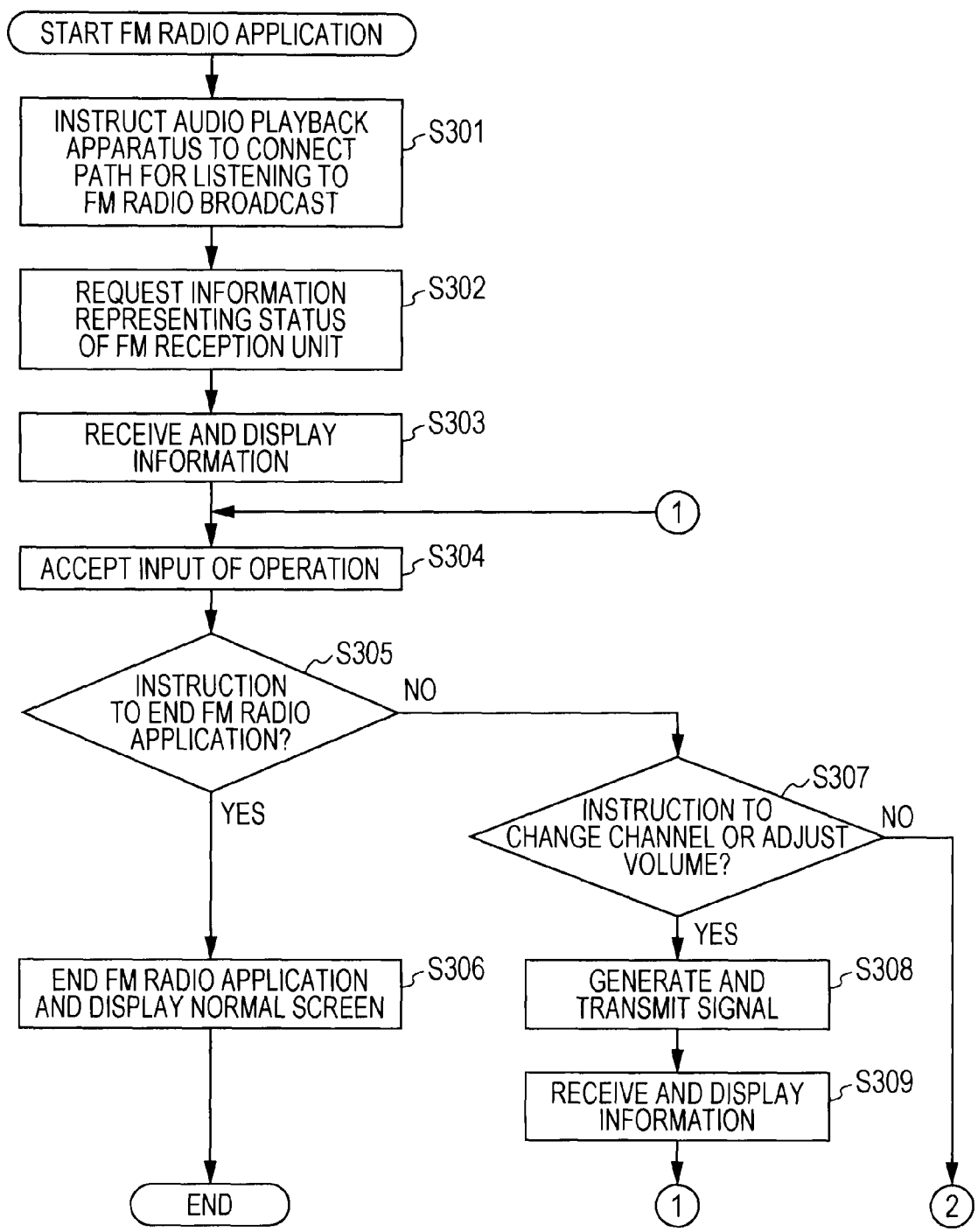
FIG. 10 is a flowchart for explaining operation of the mobile phone terminal according to the third embodiment.
Figure 11:
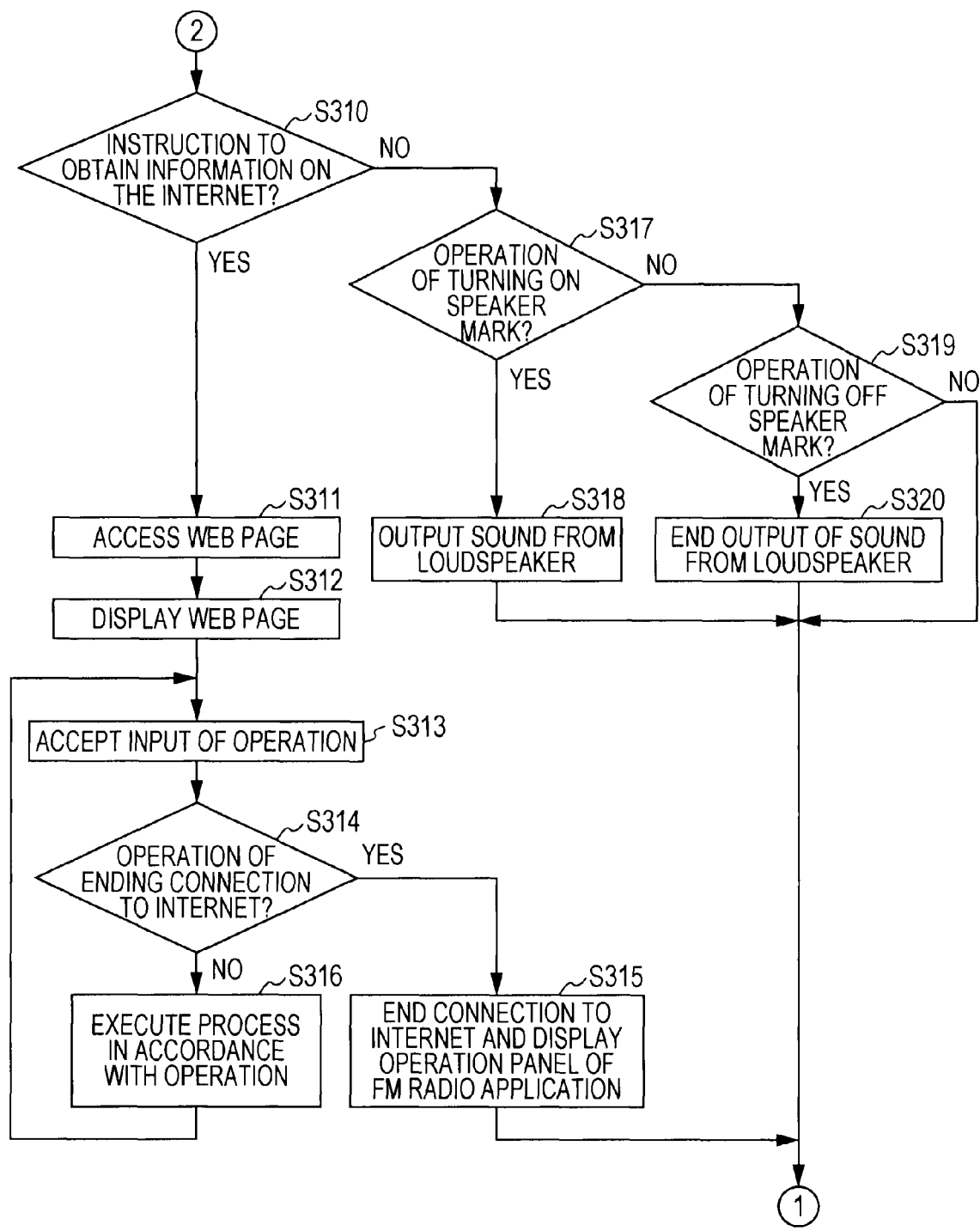
FIG. 11 is a flowchart continued from the flowchart in FIG. 10.

FIGS. 10 and 11 are flowcharts for explaining the operation of the mobile phone terminal 200C according to the third embodiment. The process illustrated in the flowcharts in FIGS. 10 and 11 is executed by the control unit 220 when the FM radio application 224 is selected from the menu displayed on the LCD 222 of the mobile phone terminal 200C, as described above.

When the FM radio application 224 is to be executed, the control unit 220 of the mobile phone terminal 200C instructs the audio playback apparatus 100C to connect a path for listening to FM radio broadcast (step S301). In step S301, the control unit 220 generates a control signal for playing back an audio signal supplied from the FM reception unit 3a and transmits the control signal to the audio playback apparatus 100C through the near field wireless communication unit 232 and the transmission/reception antenna 233, as described above.

After that, the control unit 220 requests information representing the status of the FM reception unit 3a, etc., to the audio playback apparatus 100C (step S302). That is, in step S302, the control unit 220 generates a request for providing information, such as selected channel frequency information, volume information, and the name of a song multiplexed on an FM broadcast signal that is received and selected, and transmits the request to the audio playback apparatus 100C through the near field wireless communication unit 232 and the transmission/reception antenna 233.

Then, the control unit 220 receives the requested information from the audio playback apparatus 100C through the transmission/reception antenna 233 and the near field wireless communication unit 232, and displays the operation panel of the FM radio application 224 including the information on the LCD 222 (step S303). The operation panel displayed in step S303 is the operation panel described above with reference to FIG. 9.

The control unit 220 accepts input of an operation through the operation unit 221 that is provided as an operation unit including the display of the operation panel displayed on the LCD 222 and the touch panel 223 and a hard button switch (step S304). Then, the control unit 220 determines whether the accepted operation is an instruction to end the FM radio application 224 (step S305).

If it is determined in step S305 that an instruction to end the FM radio application 224 is provided, the control unit 220 ends the execution of the FM radio application 224 to display a normal screen on the LCD 222 (step S306). Then, the process illustrated in FIGS. 10 and 11 ends.

If it is determined in step S305 that the accepted operation is not the instruction to end the FM radio application 224, the control unit 220 determines whether the accepted operation is an instruction to change the selected channel or an instruction to adjust the volume provided to the audio playback apparatus 100C (step S307).

If it is determined in step S307 that the accepted operation is an instruction to change the selected channel or an instruction to adjust the volume, the control unit 220 generates a channel selection control signal or a volume control signal in accordance with the instruction and transmits the generated signal to the audio playback apparatus 100C (step S308). In step S308, the channel selection control signal or the volume control signal is transmitted to the audio playback apparatus 100C through the near field wireless communication unit 232 and the transmission/reception antenna 233.

When the audio playback apparatus 100C changes the selected channel or adjusts the volume on the basis of the channel selection control signal or the volume control signal supplied from the mobile phone terminal 200C, the audio playback apparatus 100C transmits information representing the status after the change or adjustment. Accordingly, the control unit 220 of the mobile phone terminal 200C receives the information through the transmission/reception antenna 233 and the near field wireless communication unit 232 and displays the information on the operation panel that is displayed on the LCD 222 (step S309).

That is, in step S309, display of the selected channel frequency, display in the area AX for the name of a broadcast station, or display of the volume meter EX is changed. After step S309, the control unit 220 repeats the process from step S304 to accept input of another operation from the user.

If it is determined in step S307 that the operation accepted in step S304 is not an instruction to change the selected channel of FM radio broadcast or an instruction to adjust the volume, the control unit 220 proceeds to step S310 in FIG. 11.

Then, the control unit 220 determines whether the accepted operation is an instruction to obtain information disclosed over the Internet (step S310). Specifically, in step S310, the control unit 220 determines whether the user has performed an operation of touching the area AX for displaying the name of a broadcast station or the area FX for displaying the name of a song with his/her finger or the like, as described above.

If it is determined in step S310 that an instruction to obtain information disclosed over the Internet has been accepted, the control unit 220 executes a process of accessing a target web page (step S311). Specifically, in step S311, the control unit 220 obtains the URL corresponding to the accepted instruction from a memory therein, such as an EEPROM, controls the communication system 210 to access the Internet, thereby accessing the target web page.

After that, the control unit 220 displays the target web page on the LCD 222 (step S312) so as to accept input of an operation to the web page (step S313). Then, the control unit 220 determines whether the accepted operation is a predetermined operation of ending the connection to the Internet (step S314).

If it is determined in step S314 that the predetermined operation of ending the connection to the Internet has been performed, the control unit 220 controls the communication system 210 to end the connection to the Internet and displays the operation panel of the FM radio application 224 on the LCD 222 (step S315). After that, the control unit 220 repeats the process from step S304 in FIG. 10 to accept input of another operation from the user.

If it is determined in step S314 that the predetermined operation of ending connection to the Internet has not been performed, the control unit 220 performs a process corresponding to the accepted operation, for example, downloads target information or uploads information from the user (step S316). After that, the control unit 220 repeats the process from step S313 to accept input of another operation from the user.

If it is determined in step S310 that an instruction to obtain information disclosed over the Internet has not been accepted, the control unit 220 determines whether the accepted operation is an operation of turning on the speaker mark (step S317).

If it is determined in step S317 that an operation of turning on the speaker mark has been accepted, the control unit 220 performs a process of outputting the sound corresponding to an audio signal of an FM radio broadcast program that is currently being played back through the audio playback apparatus 100C from the loudspeaker 236 (step S318).

Specifically, in step S318, the control unit 220 generates a request for providing an audio signal of the FM radio broadcast program that is being received by the FM reception unit 3a, and transmits the request to the audio playback apparatus 100C through the near field wireless communication unit 232 and the transmission/reception antenna 233. Accordingly, the audio playback apparatus 100C transmits audio data of the FM radio broadcast program that is received and selected, and the control unit 220 receives the audio data through the transmission/reception antenna 233 and the near field wireless communication unit 232. Then, a process of playing back the sound corresponding to the received audio data is performed through the path including the control unit 220, the D/A converter 234, the amplifier 235, and the loudspeaker 236. After step S318, the control unit 220 repeats the process from step S304 in FIG. 10, so as to accept input of another operation from the user.

If it is determined in step S317 that an operation of turning on the speaker mark has not been accepted, it is determined whether an operation of turning off the speaker mark has been accepted (step S319). If it is determined in step S319 that an operation of turning off the speaker mark has been accepted, the control unit 220 performs a process of ending playback of sound from the loudspeaker 236 (step S320).

In step S320, the control unit 220 generates a request for stopping provision of the audio signal of the FM radio broadcast program received by the FM reception unit 3a, and transmits the request to the audio playback apparatus 100C through the near field wireless communication unit 232 and the transmission/reception antenna 233. Accordingly, transmission of audio data from the audio playback apparatus 100C stops. Also, the control unit 220 ends the process of playing back received audio data performed in the mobile phone terminal 200C.

After step S320, the control unit 220 repeats the process from step S304 illustrated in FIG. 10, so as to accept input of another operation from the user. If it is determined in step S319 that an operation of turning off the speaker mark has not been accepted, the accepted operation is not an effective operation, and thus the control unit 220 repeats the process from step S304 illustrated in FIG. 10, so as to accept input of another operation from the user.

In this way, various operations related to the function of receiving FM radio broadcast of the audio playback apparatus 100C are accepted from the mobile phone terminal 200C, and the audio playback apparatus 100C can be controlled from the mobile phone terminal 200C. Accordingly, the mobile phone terminal 200C operates as if it has an FM reception unit although it does not have the FM reception unit, so that the user can listen to FM radio broadcast or the like through the audio playback apparatus 100C.

Operation of Audio Playback Apparatus 100C

Figure 12:
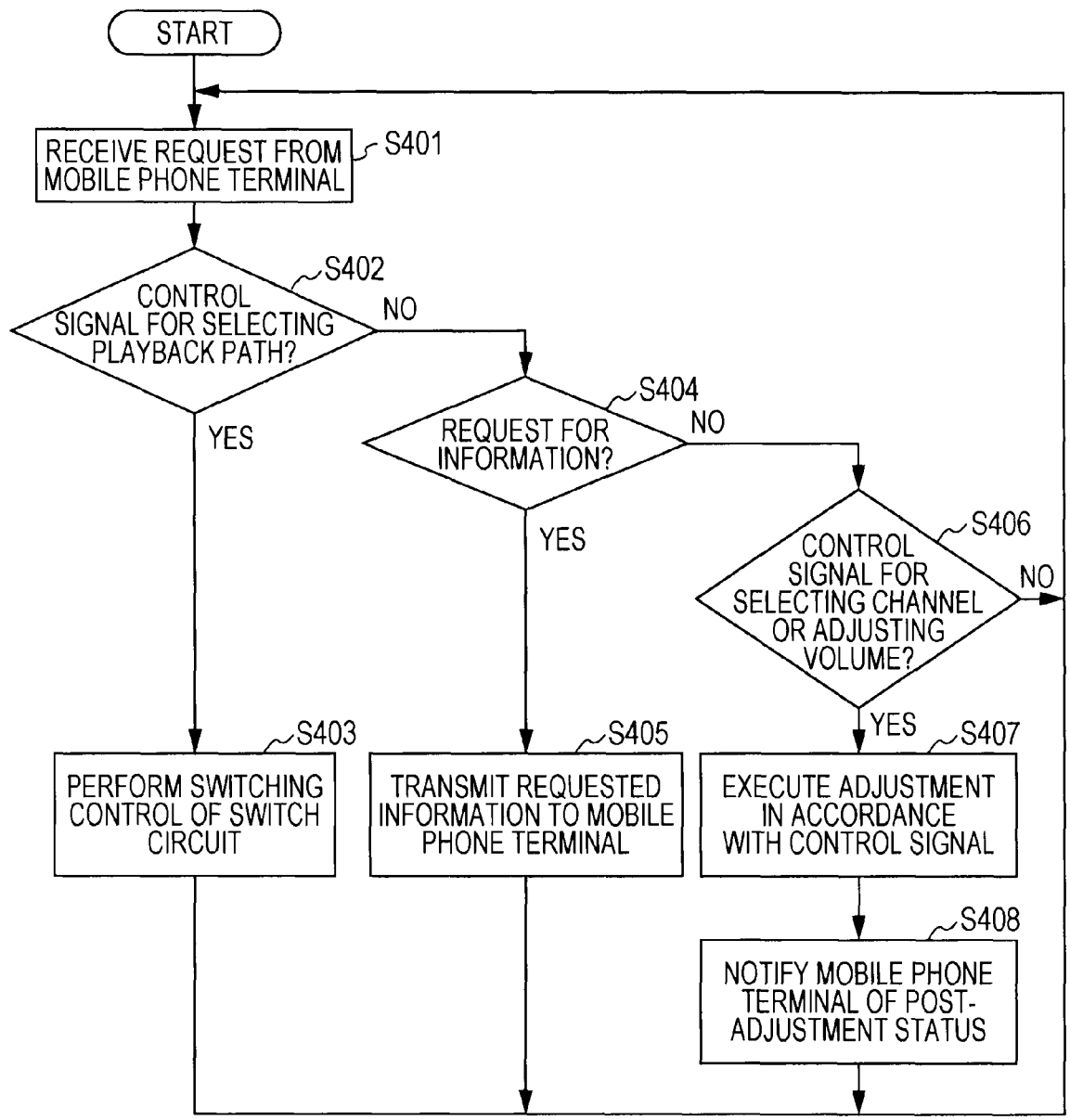
FIG. 12 is a flowchart for explaining operation of the audio playback apparatus according to the third embodiment.
Figure 13:
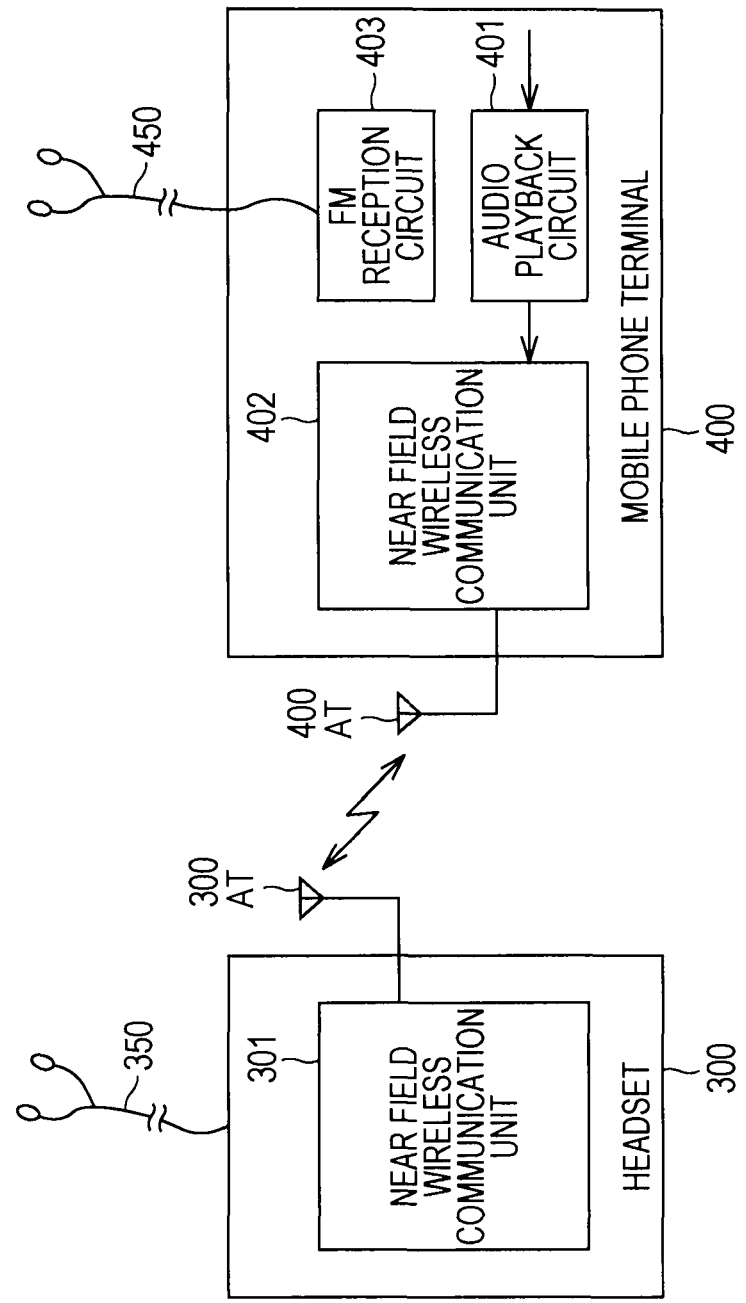
FIG. 13 is a diagram for explaining a form of using a mobile phone terminal including an FM reception circuit and a wireless headset according to the related art.

Next, operation of the audio playback apparatus 100C will be described. FIG. 12 is a flowchart for explaining the operation of the audio playback apparatus 100C according to the third embodiment. When the power of the audio playback apparatus 100C is turned on, the ACPU 7a of the audio playback apparatus 100C executes the process illustrated in FIG. 12.

The ACPU 7a receives a request or the like from the mobile phone terminal 200C through the near field wireless communication unit 2a (step S401). When receiving a request or the like from the mobile phone terminal 200C through the near field wireless communication unit 2a, the ACPU 7a determines whether the request or the like received from the mobile phone terminal 200C is a control signal for selecting a path for playing back an audio signal (step S402).

If it is determined in step S402 that a control signal for selecting a path for playing back an audio signal has been received, the ACPU 7a performs switching control on the switch circuit 9a in accordance with the control signal (step S403). That is, in step S403, if the control signal transmitted from the mobile phone terminal 200C is an instruction to play back an audio signal supplied from the FM reception unit 3a, the ACPU 7a switches the switch circuit 9a to the FM reception unit 3a side. If the control signal transmitted from the mobile phone terminal 200C is an instruction to play back an audio signal supplied from the mobile phone terminal 200C, the ACPU 7a switches the switch circuit 9a to the D/A converter 8 side. After step S403, the ACPU 7a repeats the process from step S401.

If it is determined in step S402 that a control signal for selecting a path for playing back an audio signal has not been received, the ACPU 7a determines whether the request or the like received from the mobile phone terminal 200C in step S401 is a request for providing information (step S404).

If it is determined in step S404 that a request for providing information has been received, the ACPU 7a obtains the requested information and transmits the information to the mobile phone terminal 200C through the near field wireless communication unit 2a and the transmission/reception antenna 1 (step S405). Examples of the information obtained and transmitted in step S405 include currently-selected channel frequency information in the FM reception unit 3a, volume information in the amplifier 4a, and the name of a song multiplexed on an FM broadcast signal. After step S405, the ACPU 7a repeats the process from step S401.

If it is determined in step S404 that a request for providing information has not been received, the ACPU 7a determines whether the request or the like received from the mobile phone terminal 200C in step S401 is a control signal for selecting a channel or adjusting the volume (step S406).

If it is determined in step S406 that the request or the like received from the mobile phone terminal 200C is a control signal for selecting a channel or adjusting the volume, the ACPU 7a executes adjustment in accordance with the received control signal (step S407). That is, in step S407, the ACPU 7a performs change of the selected channel of broadcast signals in the FM reception unit 3a or adjustment of the volume in the amplifier 4a.

After that, the ACPU 7a notifies the mobile phone terminal 200C of the post-adjustment status through the near field wireless communication unit 2a and the transmission/reception antenna 1 (step S408). That is, in step S408, selected channel frequency information or volume information after adjustment is provided to the mobile phone terminal 200C.

After step S408, the ACPU 7a repeats the process from step S401. If it is determined in step S406 that the request or the like from the mobile phone terminal 200C is not a control signal for selecting a channel or adjusting the volume, the ACPU 7a determines that the received request is not effective, and repeats the process from step S401.

In this way, the audio playback apparatus 100C according to the third embodiment is capable of playing back an audio signal supplied from the FM reception unit 3a in accordance with control performed by the mobile phone terminal 200C. Also, the audio playback apparatus 100C is capable of playing back an audio signal that is provided from the mobile phone terminal 200C, that is received through the near field wireless communication unit 2a, and that is converted into an analog signal by the D/A converter 8 in accordance with control performed by the mobile phone terminal 200C.

Furthermore, the audio playback apparatus 100C is capable of controlling selection of a channel in the FM reception unit 3a or the volume in the amplifier 4a in accordance with control performed by the mobile phone terminal 200C.

Program According to Embodiment of Present Invention

The program corresponding to the flowchart illustrated in FIG. 12 is a control program for an audio playback apparatus installed in the audio playback apparatus 100C according to an embodiment of the present invention. The program corresponding to the flowcharts illustrated in FIGS. 10 and 11 is an audio playback apparatus usage program installed in the mobile phone terminal 200C according to an embodiment of the present invention.

Correspondence of Structures with Functions

In the above-described embodiments, the FM reception units 3 and 3a of the audio playback apparatuses realize the function of an FM reception circuit, the near field wireless communication units 2 and 2a realize the function of a near field wireless communication circuit, and the switch circuits 9 and 9a realize the function of a switch circuit. Also, the connection terminal 5 of the audio playback apparatus realizes the function of a connection terminal.

In the above-described embodiments, the ACPU 7a of the audio playback apparatus realize the function of a controller or control means. Also, the ACPU 7a of the audio playback apparatus mainly realize the function of switch controller or switch control means, and the ACPU 7a and the near field wireless communication unit 2a realize the function of information providing means or mechanism.

Also, the near field wireless communication unit 223 of the mobile phone terminal 200C realizes the function of the near field wireless communication circuit, the LCD 222 realizes the function of display, the touch panel 223 and the LCD 222 realize the function of accepting means or mechanism, and the control unit 220 realizes the function of request transmission means (or mechanism) and display control means (or mechanism).

In the above-described embodiments, the mobile phone terminals 200A, 200B, and 200C supply audio signals to the audio playback apparatuses 100A, 100B, and 100C. Alternatively, the following various electrical apparatuses that have an audio playback function and a near field wireless communication function can be used as terminal apparatuses that supply audio signals to the audio playback apparatuses 100A, 100B, and 100C: a music player that uses various types of recording media, such as a semiconductor memory, a hard disk, a compact magneto-optical disc called a MINIDISC (registered trademark), and an optical disc including a compact disc (CD); a mobile information terminal called a personal digital assistant (PDA); a tablet computer; and a notebook personal computer.

In the above-described embodiments, near field wireless communication based on the Bluetooth standard is used. In the Bluetooth standard, 2.4 GHz is used, and wireless communication is performed at 24 Mbps at the maximum with an apparatus installed with Bluetooth within a 10- to 100-meter radius.

Alternatively, the standards for near field wireless communication other than the Bluetooth standard, such as ZigBee and TransferJet, may also be used.

The audio playback apparatuses 100A, 100B, and 100C and the mobile phone terminals 200A, 200B, and 200C may be operated in a hard operation manner using a button or the like, in a soft operation manner using a touch panel or the like, or in a combination thereof.

In the audio playback apparatuses 100A, 100B, and 100C and the mobile phone terminals 200A, 200B, and 200C, information is transmitted/received between individual circuits with the use of an interface, such as an inter-integrated circuit (I2C) or a serial peripheral interface (SPI).

The appearances of the audio playback apparatuses 100A and 100B illustrated in FIGS. 3 and 6 are merely examples, and other various forms are acceptable. Also, the operation panel illustrated in FIG. 9 is merely an example, and other various forms are acceptable.

In the above-described embodiments, the switch circuits 9 and 9a are used to switch between the case of playing back a broadcast signal that is received and selected by the FM reception unit 3 and the case of playing back an audio signal that is received from the mobile phone terminal 200 through the near field wireless communication unit 2.

Alternatively, sound to be played back can be selected by controlling the circuit unit for supplying power. That is, in the case of playing back a broadcast signal that is received and selected by the FM reception unit 3, power is supplied to the FM reception unit 3 to operate it, and no power is supplied to the D/A converter 8 not to operate it. On the other hand, in the case of playing back an audio signal that is received from the mobile phone terminal 200 through the near field wireless communication unit 2, power is supplied to the D/A converter 8 to operate it, and no power is supplied to the FM reception unit 3 not to operate it. In this way, a path of an audio signal to be played back can be selected.

The FM radio application 224 (FIG. 8) may be software downloadable, and then executed by a processor (or control unit). The downloaded software can be in the form of an application, or app, accessible from remote server, and downloaded (wirelessly or over a wired network) to the mobile phone terminal.

It should be understood by those skilled in the art that various modifications, combinations, sub-combinations and alterations may occur depending on design requirements and other factors insofar as they are within the scope of the appended claims or the equivalents thereof.

What is claimed is:

1. An audio playback apparatus comprising:
   a headset, wearable by a user of the audio playback apparatus, the headset including speakers to output an audio signal; and
   circuitry within the headset, the circuitry including
      a broadcast reception circuit configured to receive a broadcast signal;
      a near field wireless communication circuit configured to communicate with a mobile terminal apparatus and receive a local audio signal from the mobile terminal apparatus;
      a switch that controllably switches an audio source for output between the broadcast signal and the local audio signal;
      a user interface configured to
         display an audio output mode of the audio playback apparatus, the audio output mode indicating the audio source for output by the audio playback apparatus, the audio source being one of the broadcast signal and the local audio signal; and
         receive a user input to select the audio output mode;
      control circuitry configured to
         control the switch to switch the audio source to be the broadcast signal when the user input indicates that the selected audio output mode is the broadcast signal; and
         control the switch to switch the audio source to be the local audio signal when the user input indicates that the selected audio output mode is the local audio signal; and
      a connection terminal configured to electrically connect said audio playback apparatus to an external device, wherein
   the headset outputs the audio source switched by the switch to the user.

2. The apparatus of claim 1, wherein said broadcast reception circuit is further configured to receive an FM signal.

3. The apparatus of claim 2, wherein said broadcast reception circuit is further configured to receive at least one of a satellite radio signal, a digital audio broadcast signal, and a wireless Internet radio station signal.

4. The apparatus of claim 1, wherein said near field wireless communication circuit is further configured to provide said mobile terminal apparatus with information regarding said broadcast signal received by said broadcast reception circuit to be displayed on said mobile terminal apparatus.

5. The apparatus of claim 4, wherein said information includes metadata associated with programming content contained in said broadcast signal.

6. The apparatus of claim 4, wherein said information includes signal strength of said broadcast signal as received by said broadcast reception circuit.

7. The apparatus of claim 1, wherein said broadcast signal is a radio frequency signal received via an earphone device that is connected to said connection terminal and is supplied to said broadcast reception circuit via the connection terminal.

8. The apparatus of claim 1, wherein the user interface is further configured to
   display available audio sources received by the apparatus and the mobile terminal apparatus in addition to the audio source output by the audio playback apparatus, and
   receive a user selection of the audio output mode from the displayed available audio sources.

9. The apparatus of claim 8, wherein the user interface is further receive the selection via a touch interface.

10. The apparatus of claim 1, wherein the user interface is further receive the user input via a touch interface.

11. A mobile terminal apparatus comprising:
a mobile telephone communications component;
control circuitry;
a near field wireless communication circuit configured to
communicate wirelessly with an audio playback apparatus including a headset, wearable by a user of the audio playback apparatus, the headset including speakers to output an audio signal, and a broadcast reception circuit that receives a broadcast signal; and
transmit a local audio signal to the audio playback apparatus; and
a user interface configured to
display an audio output mode of the audio playback apparatus, the audio output mode indicating an audio source for output by the audio playback apparatus, the audio source being one of the broadcast signal and the local audio signal; and
receive a user input to select the audio output mode, wherein said control circuitry is configured to
issue a first control command via said near field wireless communication circuit to control a switch of the audio playback apparatus to switch the audio source to be the broadcast signal when the user input indicates that the selected audio output mode is the broadcast signal, and
issue a second control command via said near field wireless communication circuit to control the switch of the audio playback apparatus to switch the audio source to be the local audio signal when the user input indicates that the selected audio output mode is the local audio signal,
reception of said broadcast signal by said audio playback apparatus is performed without using an antenna of said mobile terminal apparatus, and
the headset of the audio playback apparatus outputs the audio source switched by the switch to the user.

12. The mobile terminal apparatus of claim 11, wherein the user interface further includes a display, and
said near field wireless communication circuit is configured to receive from said audio playback apparatus information regarding said broadcast signal received by said audio playback apparatus for presentation on said display of said mobile terminal apparatus.

13. The mobile terminal apparatus of claim 12, wherein said information includes metadata associated with programming content contained in said broadcast signal.

14. The mobile terminal apparatus of claim 12, wherein said information includes signal strength of said broadcast signal as received by said audio playback apparatus.

15. The mobile terminal apparatus of claim 11, wherein the control circuitry includes a processor, and
the mobile terminal apparatus further comprises a non-transitory computer readable storage device that includes instructions that when executed by said processor causes the control circuitry to interact with said audio playback apparatus.

16. A method of controlling an audio playback apparatus, the method comprising:
receiving a broadcast signal with a broadcast reception circuit;
receiving a local audio signal with a near field wireless communication circuit from a mobile terminal apparatus;
displaying an audio output mode of the audio playback apparatus, the audio output mode indicating an audio source for output by the audio playback apparatus, the audio source being one of the broadcast signal and the local audio signal;
receiving a user input to select the audio output mode;
controllably switching the audio source to be the broadcast signal when the user input indicates that the selected audio output mode is the broadcast signal;
controllably switching the audio source to be the local audio signal when the user input indicates that the selected audio output mode is the local audio signal; and
outputting the audio source via a speakers of a headset, the headset wearable by a user of the audio playback apparatus, the audio source output by the headset to the user of the audio playback apparatus.

17. The method of claim 16, wherein said broadcast signal includes receiving at least one of a FM signal, a satellite radio signal, a digital audio broadcast signal, and a wireless Internet radio station signal.

18. The method of claim 16, further comprising transmitting, to said mobile terminal apparatus, information regarding said received broadcast signal to be displayed on said mobile terminal apparatus, said information including one of metadata associated with programming content contained in said broadcast signal, and signal strength of said broadcast signal.

19. A non-transitory computer readable storage device having instructions that when executed by a processor perform a control process for a mobile terminal connected to an audio playback apparatus, the control process comprising:
communicating wirelessly with the audio playback apparatus including a headset, wearable by a user of the audio playback apparatus, the headset including speakers to output an audio signal, and a broadcast reception circuit that receives a broadcast signal;
transmitting a local audio signal to the audio playback apparatus;
displaying an audio output mode of the audio playback apparatus, the audio output mode indicating an audio source for output by the audio playback apparatus, the audio source being one of the broadcast signal and the local audio signal;
receiving a user input to select the audio output mode;
issuing a first control command to control a switch in said audio playback device to switch the audio source to be the broadcast signal when the user input indicates that the selected audio output mode is the broadcast signal; and
issuing a second control command to control the switch in said audio playback device to switch the audio source to be the local audio signal when the user input indicates that the selected audio output mode is the local audio signal, wherein
the headset of the audio playback apparatus outputs the audio source switched by the switch to the user.

20. The non-transitory computer readable medium of claim 19, wherein the control process further comprises:
receiving from said audio playback apparatus information regarding said broadcast signal received by said audio playback apparatus; and
presenting said information on a display of said mobile terminal apparatus.

21. The non-transitory computer readable medium of claim 20, wherein said information includes one of metadata associated with programming content contained in said broadcast signal, and signal strength of said broadcast signal as received by said audio playback apparatus.

22. The non-transitory computer readable medium of claim 19, wherein the control process further comprises downloading said instructions from a remote device as an application.

* * * * *